(12) United States Patent
Sonnabend et al.

(10) Patent No.: US 8,432,297 B2
(45) Date of Patent: Apr. 30, 2013

(54) PARKING INFORMATION COLLECTION SYSTEM AND METHOD

(76) Inventors: Eric Sonnabend, Boston, MA (US); Marc Landman, Bedford, MA (US)

( * ) Notice: Subject to any disclaimer, the term of this patent is extended or adjusted under 35 U.S.C. 154(b) by 0 days.

(21) Appl. No.: 13/271,016

(22) Filed: Oct. 11, 2011

(65) Prior Publication Data
US 2012/0062395 A1 Mar. 15, 2012

Related U.S. Application Data

(63) Continuation of application No. 13/194,896, filed on Jul. 29, 2011, now Pat. No. 8,063,797.

(60) Provisional application No. 61/369,675, filed on Jul. 31, 2010.

(51) Int. Cl.
 *B60Q 1/48* (2006.01)
 *G08G 1/14* (2006.01)
(52) U.S. Cl.
 USPC ........................................ 340/932.2; 382/103
(58) Field of Classification Search ............... 340/932.2, 340/933, 937, 992, 995.12–995.15, 995.22, 340/995.25; 382/103, 104
See application file for complete search history.

(56) References Cited

U.S. PATENT DOCUMENTS

| | | | |
|---|---|---|---|
| 5,465,115 A | 11/1995 | Conrad et al. | |
| 5,633,946 A | 5/1997 | Lachinski et al. | |
| 5,696,503 A | 12/1997 | Nasburg | |
| 6,453,056 B2 | 9/2002 | Laumeyer et al. | |
| 7,538,690 B1 | 5/2009 | Kaplan et al. | |
| 7,714,742 B1 | 5/2010 | Noworolski et al. | |
| 8,063,797 B1 * | 11/2011 | Sonnabend et al. | ....... 340/932.2 |
| 2010/0042318 A1 | 2/2010 | Kaplan et al. | |
| 2010/0060485 A1 | 3/2010 | Kim | |
| 2010/0328104 A1 | 12/2010 | Groft | |

OTHER PUBLICATIONS

Parkopedia Parking by Parkopedia Ltd, found in Apple iTunes Preview, last updated May 22, 2011.

* cited by examiner

*Primary Examiner* — John A Tweel, Jr.
(74) *Attorney, Agent, or Firm* — Noah Sachs

(57) ABSTRACT

An integrated parking information system is disclosed. The system includes a collection system and a means for collection of parking data, and an information provision system and a method for the provision of parking information, for instance, enabling a driver to know exactly which city parking rules and fines apply for any given street parking space, as well as other associated information. The system can notify members about available parking spots through a GPS application that is integrated with phones & in dash Navigation Systems. The system can provide alerts to protect members against parking violations.

27 Claims, 16 Drawing Sheets

PARKING INFORMATION COLLECTION SYSTEM AND METHOD

REFERENCE TO RELATED APPLICATIONS

The present application is a continuation of U.S. Ser. No. 13/194,896, entitled "PARKING INFORMATION COLLECTION SYSTEM AND METHOD," filed on Jul. 29, 2011 now U.S. Pat. No. 8,063,797, which itself claims priority from provisional application U.S. Ser. No. 61/369,675, entitled "Integrated parking information collection and provision system and method of using the same," filed on Jul. 31, 2010, the entirety of both of which are hereby incorporated by reference herein.

FIELD OF THE INVENTION

The present invention is in the field of road vehicle parking spot information systems. More particularly, the present invention is in the field of systems for marking, locating, characterizing, databasing and distributing information regarding suitable parking spots for road vehicles and methods of using the same. Additionally, the present invention is in the field of information services for online mapping companies and global positioning system (GPS) manufacturers, smartphone and mobile device manufacturers, data plan and wireless service providers, application creators and developers, and mobile operating system developers and distributors.

BACKGROUND OF THE INVENTION

Parking tickets are a major problem and expense for private and commercial vehicle operators worldwide. Parking rules are unclear, opaque, ambiguous, inconsistent and confusing, leaving operators in the dark as to their compliance with applicable parking rules. As a result, more than $5 billion is spent on parking violations in the top 50 urban areas. Vehicles get an average of four tickets per year. Significant time and money is lost driving around trying to find the best parking option. Significant fuel is consumed in merely trying to locate a parking spot. This excess traffic attributable to locating a parking spot translates into excess fuel consumption, wasted time, traffic congestion, and emissions pollution.

Circling streets around a destination in search of nearby parking wastes precious time and creates frustration. The frustration is even greater when returning to a parking space to discover that a car has been towed because of a violation such as the street cleaning schedule. Finally, ambiguous or missing signage leads many drivers to simply pay parking tickets even when they were, in fact, legally parked. Parking complaints are commonplace among people living in or visiting cities.

Commercial drivers also experience difficulties with parking. Delivery services, cleaning companies, contractors and other local businesses often view parking tickets as just a cost of business. In the US alone, over six million mobile resource management (MRM) systems have been deployed, with the number expected to double in the next five years.

There are a number of local providers in certain markets that provide information regarding street parking and public garages. There are several providers that provide auctions for parking spots (which is difficult due to the short time constraints of finding parking). A few providers use outdoor sensors to determine whether a parking spot is vacant.

Existing efforts at addressing the problem of parking spot information fall short in several aspects. Collecting and maintaining current parking sign data on a global scale has not successfully been accomplished. The only way to collect the parking sign data is to travel down every street of every city to capture the parking sign data. This is because cities do not actually possess the parking sign data in enough detail regarding location of parking meters, valet parking signs, loading zones, etc.; however, knowing exactly where these parking zones exist is critical information to the end-user.

What is needed is a system for capturing the parking sign data directly at the point of application—the street level. This is because there exists no accurate, central repository of parking rule information for each street and city. For the most part, cities do not possess or maintain this information in any reliable way, and assembling such a database based on an intentional planned methodology—in other words, keeping track of each sign placed and where and when it was emplaced—is simply impractical, especially in an enormous municipality where construction, vandalism, weather storms, accidents, etc., make any such effort a rapidly moving target.

Indeed, parking enforcement is performed according to what the posted parking rules are for a given alleged violation—no database can be checked; rather, the test is what was posted at the time and place of the alleged violation. Therefore, directly capturing the rules and tagging their locations is the only way to address this problem.

Additionally, there simply exists no central database of available parking spots. The only way to create such a database is to manually assemble it through actual data collection, and then continuously maintain it. This is because vehicles are continuously occupying and vacating spots all over with no central repository of tracking this data. Some smartphone parking applications exist, but nearly all of them focus on either garage parking locations or parking meter timers. None provide comprehensive information and advice about street parking in combination with recommendations on the optimal parking options.

Some companies provide parking information online, ranging from simple attempted directories of parking garages to attempted databases of on-street and off-street parking in a handful of cities. Existing online parking information systems fall short because their data is limited, stale, and does not account for dynamic changes in available parking spots, nor catalog the parking rules, nor provide location based parking rule information in real time, among other shortcomings.

Some companies attempt to deliver parking information to GPS units. Generally, these vendors focus on commercial parking garages rather than on-street parking.

Some companies provide parking applications for handheld mobile devices. These generally attempt to address only one part of the parking problem, such as meter timers, commercial parking garages, etc.

Further, all existing parking information technologies provide data that is stale, old, and frequently out-of-date. Such solutions do not provide a means for continuously updating and refreshing parking data according to a useful and effective frequency, i.e., continuously. Existing parking spot information solutions are limited geographically due to collection methodology. Further, there is no commercial user solution. There is no product or service that provides a comprehensive parking spot solution. Therefore, there is a need for a distributed, continuous parking data collection solution that can rapidly and efficiently collect and aggregate parking data. There is also a need for a convenient, timely, and accurate parking information distribution solution across multiple access points and mobile and integrated delivery means. Therefore, a system is needed that provides this data and also over various channels: online, through GPS systems, and via smartphones. There is also a further need for a contemporary, dynamically adaptive database of parking rule information for urban, suburban, and rural areas worldwide. There is also a need for parking solutions for the unique needs of commercial users.

It is against this background that various embodiments of the present invention were developed.

BRIEF SUMMARY OF THE INVENTION

The disclosed integrated parking information collection and provision system (the "parking spot information system" or the "System") can provide parking data to consumers, for example through internet based, GPS based, mobile device based, and integrated in-car based platforms. In addition, the disclosed parking spot information system partners in mapping can also integrate the disclosed parking spot information system data into existing mobile applications. The disclosed parking spot information system can be deployed in commercial application embodiments to provide a parking solution in conjunction with existing fleet management solutions to reduce the cost of parking tickets borne by commercial vehicle and fleet operators such as delivery and maintenance companies. The disclosed parking spot information system can offer integration into web services providing online mapping. In addition, the disclosed parking spot information system can provide web services for GPS manufacturers, including providing the same information as for web services for online mapping.

The disclosed parking spot information system can enable users to search for available, appropriate parking via GPS based on the location the user is physically located in real time. Users can search for appropriate parking for a desired destination, or en route parking opportunities. Users can search for parking based on a profile created by the user including the type of vehicle, how long the user will remain parked, any special access requirements, and other criteria.

The disclosed parking spot information system embodiments can enable users to search for parking by time of day according to a required destination including by query filtering for parking criteria, such as including, but not limited to: garage or on street; location; price & services; on street parking; parking rules; potential parking fine amounts; parking fine frequency and likelihood; historical parking violation activity; towing charges; booting and/or towing enforcement versus fines.

The disclosed parking spot information system can query a database of parking information in response to a user request for information such as regarding available parking spots based on location or destination, and applicable parking rules, among other information. A database of parking information can be made available to users through a GPS-enabled smartphone application, allowing drivers to use their phone to: Consult a complete database of nearby parking options; Compare the cost of nearby parking garages to the cost of a parking ticket and meter fees; Store a current parking space for assistance in locating it later to return to the vehicle; Receive alerts by text message, push notification or voice call for meter expiration, street cleaning or other upcoming violations.

The disclosed parking spot information system can provide comprehensive information about on and off street parking including: signs and city parking rules for all street locations; private garage locations and pricing; applicable parking regulations by city, street, time of day, day of week, and weather conditions (e.g. snow, parking bans); current events that could disrupt parking such as construction, detours, street repairs, moving activities, demonstrations, holidays, parades, fairs, and other events; existence of meters, price per time for meters, parking rules such as residential, commercial; alerts about meter expiration, street sweeping, snow emergencies; the ability to locate a parked car; the ability to find an open spot.

The disclosed parking spot information system can return parking information to a user in response to a query, for example regarding available spots and applicable rules. Parking spots can each be linked to relevant parking rules, and can include images of signs at each location, such as simulated or representational icons, graphics, or compressed versions of actual signage images, for example a cartoon.

In smartphone and mobile device embodiments, as well as GPS and in-dash in-car systems, the disclosed parking spot information system can enable a user to create parking alerts. Users can request a text message alert and/or voice alert to be sent to a designated device that will provide the following information: location of parked vehicle; the time one needs to move vehicle by so that operator will not get a parking ticket; the type of parking ticket operator could get if he or she does not move the vehicle by a certain time; the cost of a parking ticket and towing charges (if applicable); directions back to the vehicle from a current location, among others.

The disclosed parking spot information system has commercial and fleet vehicle embodiments. In commercial and fleet embodiments, the disclosed parking spot information system can provide the location of an employee's vehicle displayed on the dispatcher or supervisor's device along with alert information and the employee phone number so that management can be proactive by communicating with the employee to move their vehicle to a non tow zone (if applicable).

The disclosed parking spot information system can include a parking data collection system. One embodiment of a data collection subsystem can include a camera, such as a digital camera, mounted to a vehicle to continuously or periodically collect relevant data as the driver of the vehicle drives around. Another data collection subsystem embodiment can use a camera that is incorporated into a mobile device, such as a mobile personal digital assistant or camera equipped smartphone, or wirelessly enabled digital camera. The collection subsystem can further include a wireless communication device such as a mobile personal digital assistant or camera equipped smartphone, or wirelessly enabled digital camera. Such wireless communication device can have access to a wireless network such as provided by a wireless service provider, such as a voice and/or data plan, for example a 3g or 4g network, or a WAN or LAN network, such as a Wi-Fi network.

The disclosed parking spot information system collection subsystem can further include a software or hardware based Object Recognition System, such as enabled by software installed on mobile personal digital assistant or camera equipped smartphone, or wirelessly enabled digital camera, or as integrated into a standalone camera. The disclosed parking spot information system data collection subsystem can further include an OCR (optical character recognition) system such as installed on a mobile personal digital assistant or camera equipped smartphone, or wirelessly enabled digital camera, or as integrated into a standalone camera. The disclosed parking spot information system data collection subsystem can further include an offset geocode System such as installed on or enabled by a mobile personal digital assistant or camera equipped smartphone, or wirelessly enabled digital camera, or as integrated into a standalone camera, or as integrated into a GPS system, or as provided by a vehicle navigation, GPS, trip computer or other vehicle electronics. The disclosed parking spot information system collection subsystem can further include a camera management system, such as installed on a mobile personal digital assistant or camera equipped smartphone, or wirelessly enabled digital camera, or as integrated into a standalone camera, or as integrated into a GPS system, or as provided by a vehicle navigation, GPS, trip computer or other vehicle electronics.

The disclosed parking spot information system collection subsystem can further include a data collection application for installation on a mobile personal digital assistant or camera equipped smartphone. The collection application can be downloadable from the Internet or equipped as standard on a device. The collection application can process photos collected with the device upon which it is installed or another device, in order to extract the relevant data therefrom, such by means of object recognition capability, for example to identify the existence of relevant parking elements within the photo, such as fire hydrants and parking signs. The collection application can prompt the user to confirm the identified contents for accuracy. The collection application can identify the location of the identified elements on a map, such as by means of the GPS capability of the mobile device and a map as is accessible through the interne. The collection application can mark the location of the identified elements on the map and suggest to the user the determined location of the elements, and prompt the user to confirm the location of the identified elements.

The disclosed parking spot information system can include a centralized parking information database repository of all collected parking information collected by data collectors via the disclosed parking spot information system collection subsystem elements. The disclosed parking spot information system centralized database can include a parking regulations database aggregating all posted parking regulations for all covered areas. Before or after the existence, identity, contents, or location of identified elements are confirmed by the user of device, such as a mobile device the collection application can upload the information to a central database for incorporation, processing, or provision to consumers of the parking information systems. The database can include collected data regarding the existence of meters, price per time for meters, parking rules such as residential, commercial, etc., as well as other information relevant to parking.

Embodiments of the disclosed parking spot information system can include an integrated parking information system integrated into a vehicle, such as integrated into a vehicle's onboard GPS system, navigation system, trip computer system, engine management system, and/or active handling, antilock brake, automatic stability control, telemetric, or other electronic system. Such embodiments can interface directly with a central database for the provision of parking information to the operator of the vehicle and integration into the vehicle's existing navigation and location capabilities, for example to locate and identify appropriate parking opportunities for a desired destination entered into a vehicle navigation system. Such embodiments can further prompt the operator to specify the expected length of stay for a parking situation in order to select the appropriate parking spot. Such an embodiment can use vehicle information such as vehicle's wheel speed sensor and gear selection information as well as GPS location system information to indicate the location and status of the vehicle, and upload such information to the central parking database, such as information about when a vehicle occupies or vacates a parking spot.

Accordingly, one embodiment of the present invention is a method for collecting distributed parking information from two or more data collectors for use in a parking assistance system. This method comprises the steps of receiving a first offset geocoded parking datum from a first image collection subsystem operated by a first data collector, storing said first offset geocoded parking datum in a parking information database, receiving a second offset geocoded parking datum from a second image collection subsystem operated by a second data collector located remotely from the first data collector, storing said second offset geocoded parking datum in said parking information database, and then processing the first and second offset geocoded parking data to interpret parking information to be provided to the parking assistance system. The first offset geocoded parking datum is specified to a geolocation more accurate than a geolocation accuracy of said first image collection subsystem. The second offset geocoded parking datum is specified to a geolocation more accurate than a geolocation accuracy of said second image collection subsystem.

Another embodiment is the method for collecting distributed parking information from two or more data collectors for use in a parking assistance system as described above, wherein the first image collection subsystem is a standalone camera connected to a GPS-enabled network communication device.

Another embodiment is the method for collecting distributed parking information from two or more data collectors for use in a parking assistance system as described above, wherein the first image collection subsystem is a GPS-enabled handheld mobile device having a built-in camera.

Another embodiment is the method for collecting distributed parking information from two or more data collectors for use in a parking assistance system as described above, wherein the first image collection subsystem is an automatic parking data collection system.

Another embodiment is the method for collecting distributed parking information from two or more data collectors for use in a parking assistance system as described above, wherein the first parking datum is a raw image captured by said first image collection subsystem.

Another embodiment is the method for collecting distributed parking information from two or more data collectors for use in a parking assistance system as described above, wherein the first parking datum is text retrieved from a raw image captured by said first image collection subsystem by means of executing an optical character recognition algorithm.

Another embodiment is the method for collecting distributed parking information from two or more data collectors for use in a parking assistance system as described above, wherein the first parking datum is an indication of an identified street object by means of executing an object recognition algorithm.

Another embodiment is the method for collecting distributed parking information from two or more data collectors for use in a parking assistance system as described above, wherein the first parking datum is an indication of one or more obstructions in a captured image.

Another embodiment is the method for collecting distributed parking information from two or more data collectors for use in a parking assistance system as described above, wherein the first parking datum is an indication of one or more obstructions in a captured image and further comprising the step of, in response to said indication of one or more obstructions in a captured image, publishing a geocoded request to a network of data collectors for recapturing said first parking datum.

Another embodiment is the method for collecting distributed parking information from two or more data collectors for use in a parking assistance system as described above, wherein processing comprises the step of indexing said first offset geocoded parking datum by category of parking information.

Another embodiment is the method for collecting distributed parking information from two or more data collectors for use in a parking assistance system as described above, wherein processing comprises the step of associating said first offset geocoded parking datum with meta data.

Accordingly, one embodiment of the present invention is a parking information collection system. This system comprises one or more memories for storing program code, one or more communication links to a parking information database, and one or more processors, operatively connected to the one or more memories, for executing the stored program code. When the stored program code is executed, it causes the system to perform a process comprising the steps of receiving a first offset geocoded parking datum from a first image collection subsystem operated by a first data collector, storing said first offset geocoded parking datum in a parking information database, receiving a second offset geocoded parking datum from a second image collection subsystem operated by a second data collector located remotely from the first data collector, storing said second offset geocoded parking datum in said parking information database, and processing the first and second offset geocoded parking data to interpret parking information to be provided to the parking assistance system. The first offset geocoded parking datum is specified to a geolocation more accurate than a geolocation accuracy of said first image collection subsystem. The second offset geocoded parking datum is specified to a geolocation more accurate than a geolocation accuracy of said second image collection subsystem.

Another embodiment is the parking information collection system as described above, wherein the first image collection subsystem is a standalone camera connected to a GPS-enabled network communication device.

Another embodiment is the parking information collection system as described above, wherein the first image collection subsystem is a GPS-enabled handheld mobile device having a built-in camera.

Another embodiment is the parking information collection system as described above wherein the first parking datum is a raw image captured by said first image collection subsystem.

Another embodiment is the parking information collection system as described above, wherein the first parking datum is text retrieved from a raw image captured by said first image collection subsystem.

Another embodiment is the parking information collection system as described above, wherein the first parking datum is an indication of an identified street object.

Another embodiment is the parking information collection system as described above, wherein the first parking datum is an indication of one or more obstructions in a captured image.

Accordingly, one embodiment of the present invention is an automatic data collection system adapted to be connected to a mechanical means for physically moving on a street, comprising a locating means for capturing a current offset geocode in relation to said mechanical means, one or more image collection subsystems physically connected to said mechanical means, one or more memories for storing program code, and one or more processors, operatively connected to the one or more image collection subsystems, operatively connected to said locating means, and operatively connected to the one or more memories, for executing the stored program code. When the stored program code is executed, it causes the system to perform a process comprising the steps of receiving an affirmative command to collect parking information, and in response to said command, instructing one or more of said image collection subsystems to capture an image, and also in response to said command, instructing said locating means to capture the current offset geocode of said mechanical means. The offset geocode is specified to a geolocation more accurate than a geolocation accuracy of said locating means.

Another embodiment is the automatic data collection system adapted to be connected to a mechanical means for physically moving on a street as described above, wherein said affirmative command is sent periodically by a device programmed to repeat on a programmatic interval.

Other embodiments of the present invention include the methods corresponding to the systems above and the methods of operation of the systems and modules described above. Other features and advantages of the various embodiments of the present invention will be apparent from the following more particular description of embodiments of the invention as illustrated in the accompanying drawings.

DETAILED DESCRIPTION OF THE INVENTION

Figure 1:
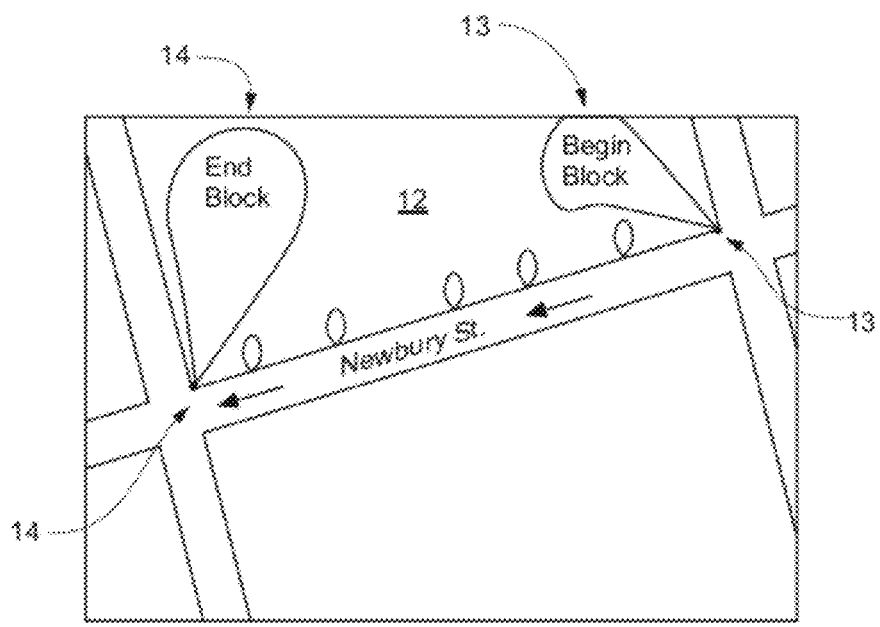
FIG. 1 illustrates a step of an embodiment of a method for resolving parking signs.

The disclosed parking spot information system uses artificial intelligence to provide parking solutions. A person walking or driving down a city block observes the relevant cues and patterns regarding a parking situation differently than a typical machine based system. The disclosed parking spot information system takes inspiration from the way a human observer relates to his or her environment in order to determine and provide parking information in a manner that is useful to a typical driver looking for a parking spot. In some embodiments, the disclosed parking spot information system can utilize artificial intelligence pattern matching algorithm to provide useful parking information to subscribers.

A simple example regarding street cleaning signs will serve as illustration: Person observes pattern and determines rule—street cleaning signs are posted every 100 feet along the length of a block. Street cleaning signs repeat the identical information over and over in a "sequence" within the "same block". A human who walks the entire block reading 5 consecutive street cleaning parking signs knows that the parking sign, which is partially obscured by applying reason that it is the same street cleaning parking sign as the other street cleaning parking signs he saw before and after. The human saw the same street cleaning sign 100' before and saw the same sign 100' after.

In some embodiments, the artificial intelligence of the disclosed parking spot information system can look for patterns, for example if street cleaning signs are posted every 100 feet along a certain block, or street cleaning signs repeat the identical information over and over in a sequence within the same block, and by recognizing these patterns the system can identify the beginning and end of a block for a street with posted street cleaning signs.

The disclosed parking spot information system can use artificial intelligence to resolve parking signs based on image data, even when the image data is compromised and the exact information on the sign cannot be recognized. This artificial intelligence can also be used to recognize parking signs and identify them when an image collected by the disclosed parking spot information system of what the system believes to be a parking sign cannot be resolved to the speed of the camera vehicle, the orientation of the sign, the camera, or the vehicle, inclement weather conditions, and other circumstances yielding compromised image fidelity. Some possible circumstances yielding compromised parking image data can include: too much direct light into the camera, too little light, too little contrast to read text shadows on the parking sign, parking sign partially obscured by a tree leaf or branch, parking sign is washed out from the sun and/or weather, parking sign is dirty, parking sign has graffiti on it, parking signs is bent because it was vandalized, parking sign is turned upside down by a prankster, and others.

Using the example, above, the disclosed parking spot information system can search for street cleaning signs in a sequence using OCR functionality and if a partially obscured sign returns a better than a threshold percentage match of what is expected based on patters of side of street, etc., then the system can recognize the sign as filing the pattern and therefore positively identify the sign.

In some embodiments of the disclosed parking spot information system, artificial intelligence data collection is enabled through object recognition or OCR alone, or a combination of image object recognition and OCR working together. For example, the system can recognize typical sign shapes using object recognition, recognize open parking spots using object recognition, recognize sign colors using object recognition, recognize sign font using object recognition &OCR, recognize sign font size using object recognition & OCR, recognize sign design layouts using object recognition & OCR, recognize the "No Parking" symbol using object recognition &OCR.

In some embodiments, parking data resolution rules are applied via command line code for mobile device applications that enable an embedded or remote object recognition system and OCR system to resolve parking signs from possible imperfect images. Real life situations are addressed by having software code rules provided by the disclosed parking spot information system applied case by case to aid object recognition and OCR.

Figure 2:
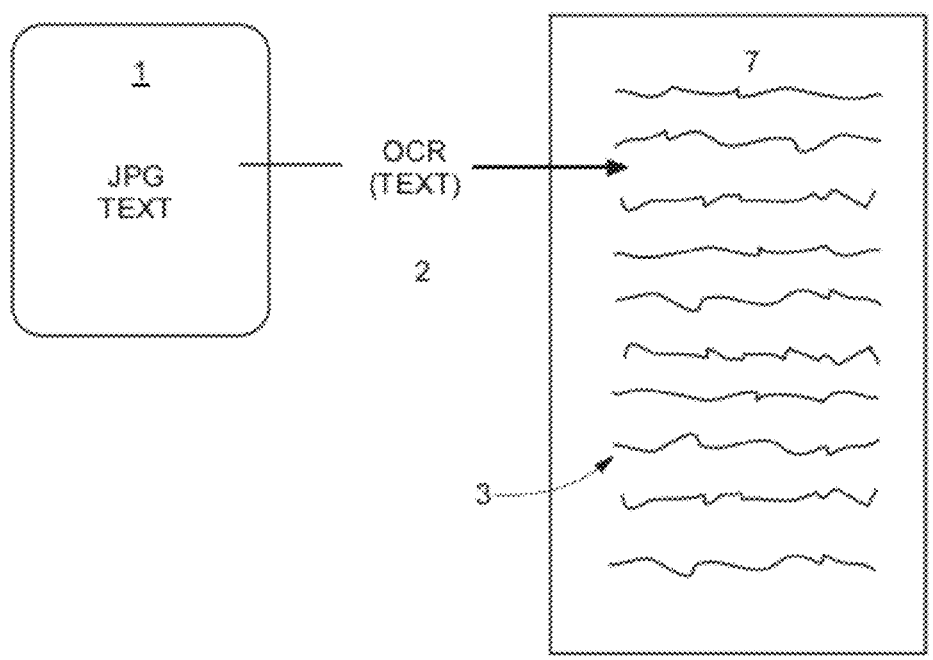
FIG. 2 illustrates an embodiment of a method for resolving parking signs and elements of an embodiment of a system for practicing the method.
Figure 3:
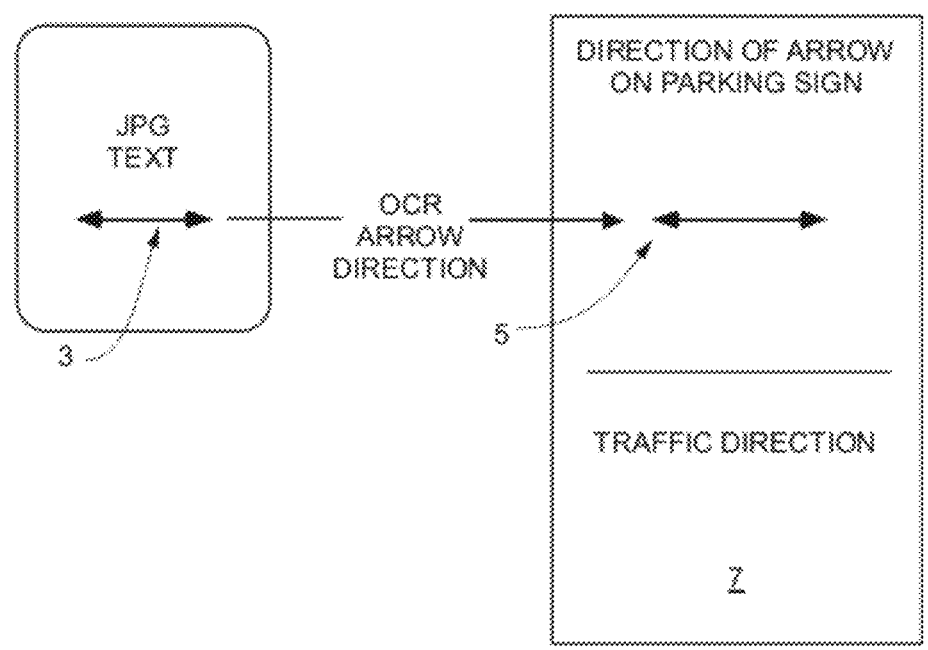
FIG. 3 illustrates an embodiment of a method for resolving parking signs and elements of an embodiment of a system for practicing the method.

For example, in some embodiments the sign resolution process can operate in a manner as follows by employing all or some of the following steps in any order: As illustrated in FIG. 1, the System can recognize and locate the block beginning 13 of a city block 12 and the block end 14 of city block 12. As illustrated in FIG. 2, the System can take a photograph of a parking sign, can turn the picture into a parking sign image 1 such as a Joint Photographic Experts Group (*.JPG) file format, and can convert 2 it, for example using optical character recognition technology, into text 3 and/or recognize presented text, for example for display on a handheld mobile communications device 7. The System can recognize sign symbology and icons, such as arrows, "prohibited" circles with a bar across them, and other common parking symbols, and then display a corresponding image to a user, for example on the screen of the user's handheld mobile communications device. For example, as illustrated in FIG. 3, the System can recognize an image of a parking sign arrow 4 on a parking sign 6 and convert it into a graphical depiction of an arrow 5 for display on a handheld mobile communications device 7 to a user, for example an arrow oriented in the same direction as displayed on the sign, which direction, for example, can correspond to a traffic direction.

Figure 4:
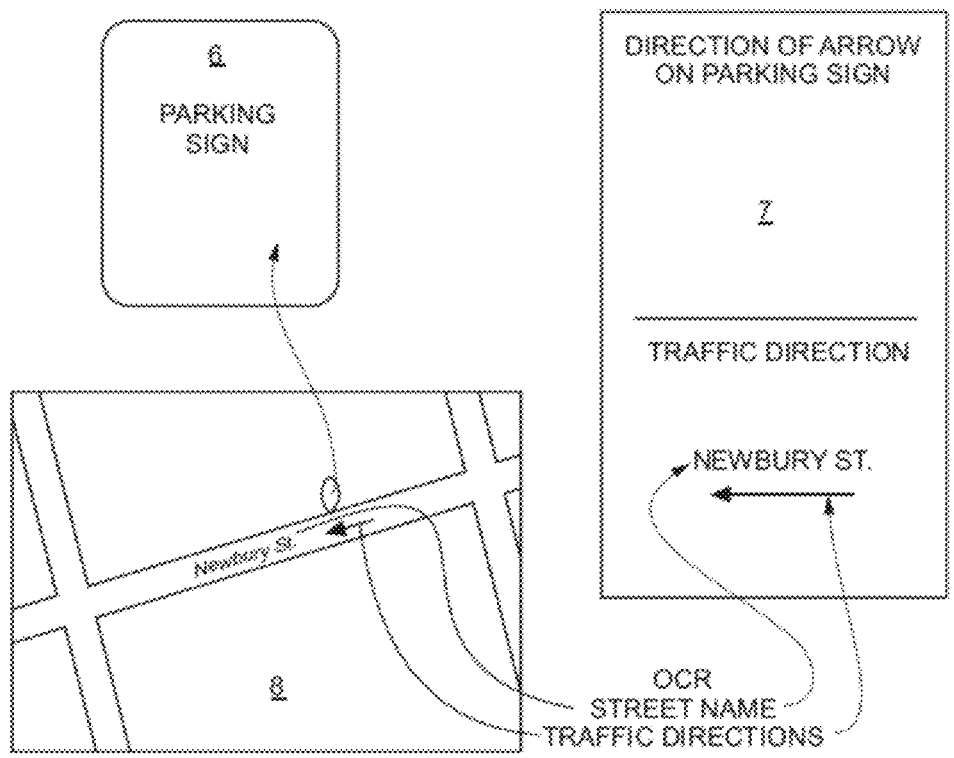
FIG. 4 illustrates an embodiment of a method for resolving parking signs and elements of an embodiment of a system for practicing the method.

As illustrated in FIG. 4, the System can recognize the direction of the traffic, resolve the location of the street upon which the observed traffic is traveling, for example using a map, such as an internet map 8, and associate the traffic direction information with the street name, and display the street name a traffic direction information on the handheld mobile communications device 7.

Figure 5:
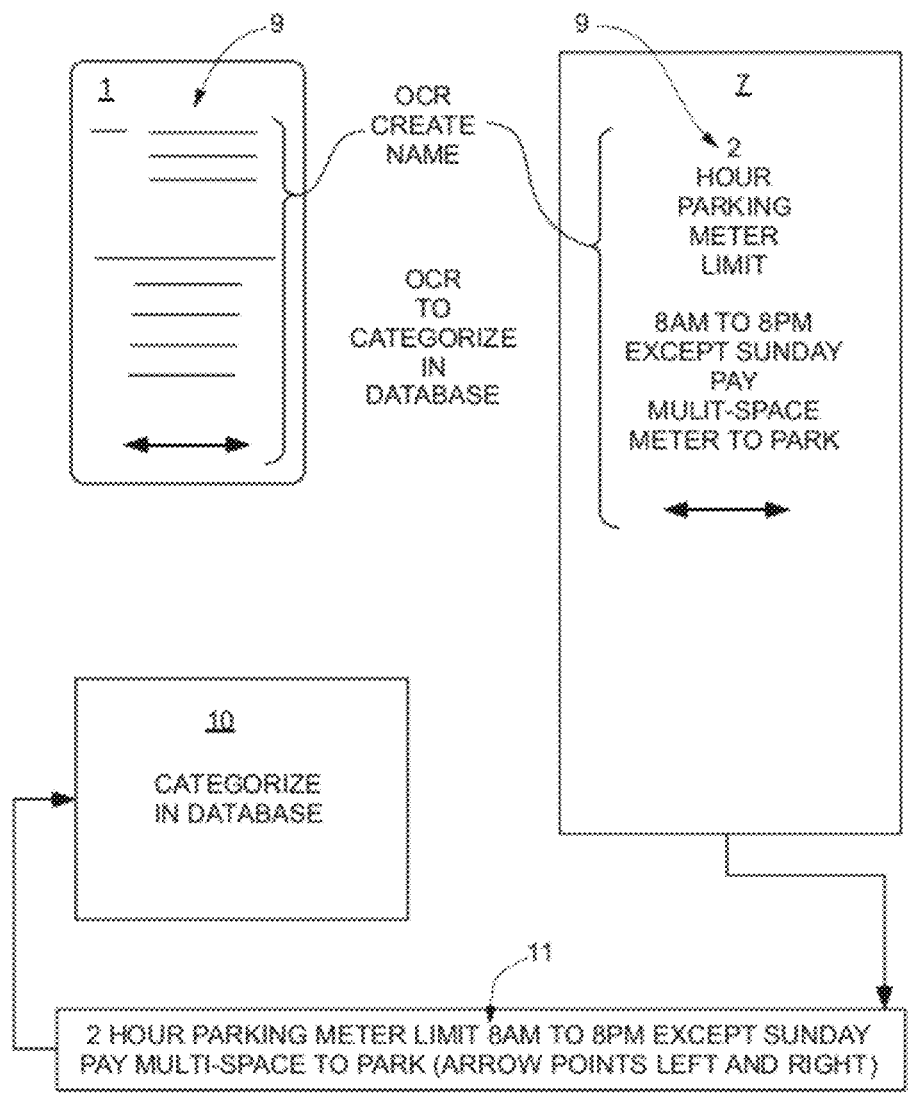
FIG. 5 illustrates an embodiment of a method for resolving parking signs and elements of an embodiment of a system for practicing the method.

As shown in FIG. 5, the System can recognize, for example using optical character recognition (OCR) and create the parking sign name 11 from the parking information 9 included in a parking sign image 1. The System can recognize the parking information 9 presented on the parking sign image 1, for example using OCR, and can categorize the information in a parking information database 10. The parking information 9 and the parking sign name 11 can be displayed on the handheld mobile communications device 7. The parking information can be associated with the parking sign name 11, which name can be unique for the information presented. The System can recognize and categorize thousands of items of parking information 9, for example 2 hour limit, parking metered spot, limit, parking time ranges, parking date ranges, and others.

The disclosed parking spot information system can include a consumer parking information product (or "consumer product" or "parking information provision system") that can be in the form of a mobile application, for example to help subscribers on their mobile handset to find safe and reliable on street or off street parking as well as provide voice and text alerts for protection against parking fines. The technologies over which the application can be deployed can include GPS and mesh-networks aggregating data collected, which can be retrieved from a network data cloud and delivered to a consumer mobile phone or other mobile devices, such as Blackberry, Windows Mobile, Nokia/Symbian, Palm, Android, and other mobile platform devices.

The consumer product can be provided to consumers through various means such as via GPS systems (for example, Magellan, Garmin, etc.); online navigation systems (for example, as offered by MapQuest, Yahoo, Google, Bing, AAA, etc.); Local shopping websites (for example, yellowpages.com, switchboard.com, localpages.com, etc.). The disclosed parking spot information system parking information system includes consumer application embodiments and commercial application embodiments suitable for fleets. The disclosed parking spot information system parking information system further includes City public works software.

The disclosed parking spot information system can include a consumer parking information product (or "consumer product" or "parking information provision system") that can be in the form of a mobile application, for example to help subscribers on their mobile handset to find safe and reliable on street or off street parking as well as provide voice and text alerts for protection against parking fines. The technologies over which the application can be deployed can include GPS and mesh-networks aggregating data collected, which can be retrieved from a network data cloud and delivered to a consumer mobile phone or other mobile devices.

The consumer product can be provided to consumers through various means such as via GPS system; online navigation systems; or local shopping websites. The disclosed parking spot information system parking information system includes consumer application embodiments and commercial application embodiments suitable for fleets. The disclosed parking spot information system parking information system further includes city public works software.

The consumer product can include mobile applications to provide consumers with relevant parking information on the consumer's handheld mobile device or other wireless mobile devices, for example, based on location or requested directions, including information to: find the closest garage and associated pricing, hours, and services; view applicable parking rules and a summary statement for a parking space; or receive push-notification text message alerts by text and voice alerts on the mobile device that inform the user where his or her car is parked, an impending parking violation and the cost of the parking fine, or other information or alerts.

Then when a consumer subscriber using the disclosed parking spot information system consumer application logs onto the system and opens the application and enters a destination into their phone or into their car's GPS System as a desired destination, that application can query the server to determine the parking situation in the vicinity of the destination and can provide updated status reports of the status of the parking situation at or around the destination and suggest alternative parking situations and places to park nearby.

The disclosed parking spot information system can employ the use of several web sites including a consumer site at which the consumer who wants to find parking information can join as a member and provide registration information such as a user profile, and downloads an application and through this website which is able to receive real time parking information. The service can be provided as a subscription and in some embodiments, a second web site can be provided in order to manage the data collection.

The functionality provided by the consumer website includes a system to find a safe and available parking space on a global map. The consumer uses this functionality, for example, by entering a query to find a parking spot. Some embodiments incorporate themed webisodes and a web series and entertainment including entertainment series.

A consumer user can use the disclosed parking spot information system to locate a parking spot by, for example, in some embodiments, by following the following steps: 1. establish an account by registering, creating a profile, and confirming that one is real person and entering personal data such as email address; 2. query the system to receive a summary statement of the parking rules that apply to a current park location; 3. receive further information can include, for example, how much it costs per time to feed a meter. A user can filter parking information using filters. Relevant parking information can be provided by the application to the user such as garage, parking meter, multi space parking, resident parking, pay parking, commercial parking, valet parking, visitor parking, commercial vehicle parking, handicap parking, no parking anytime, pickup drop-off zone, 15 minute loading zone, evacuation route, cab stand or bus route.

Other functionality can include a query to find the nearest parking spot from one's present location. Using the filters in addition the user can view the parking locations using mapping systems such as a street view. In some embodiments, the application can then provide walking distance information from the parking spot suggested to the actual destination.

The application can provide consumers with a whole host of parking solutions. For example they can log onto the mobile application which they download as an application to their mobile device. They can enter their destination and search for parking solutions in the vicinity of their destination based on parking filters such as how long they will remain in this vicinity, depending on for example whether they are there merely to drop someone off or pick someone up or whether they need to park for a long time, and can provide parking recommendations depending on the applicable parking rules on the day of the week and the time of day, which information can automatically be incorporated into the search criteria.

In addition the estimated time of arrival from the present location of the user will be calculated into the parking search filter criteria as well so that the arrival time can be accurate in terms of the parking solutions available and recommended. The user can indicate if he or she has a handicap parking pass or drives an especially long vehicle or small vehicle, if they have any special needs on access ability requirements. This application can also be incorporated into mobile phone service packages offered by providers such as Sprint and ATT.

Further, once the particular embodiment becomes aware that the user has parked it can set a timer to trigger an alarm to alert the user on the user's mobile device when any of the rules associated with the parking spot such as the lapse of the allowed parking time are impending, to allow the user a sufficient time to return to his or her car and avoid a ticket. Then once the user vacates the spot and leaves and departs the user can indicate by entering this information into the application on the mobile device and the system can automatically upload this information to the server to update the parking spot database with the addition of the vacancy in real time.

A consumer can also subscribe or elect to have alerts sent, for example in front of his or her house for street parking opportunities; this can be tied to the functionality that indicates when another user is departing, those creating a new, open spot. Further functionality includes using a compass interface application widget to facilitate finding a user's car in an open parking lot, reviewing all available parking spaces, contacting an operator of a car who is leaving a parking space to validate the parking space was still available either by a text message or SMS or by a preset function key.

Another alert that the system can be programmed to send a user is if the user parks in a spot that he or she indicates is less than ideal and would like to wait for or be alerted regarding the existence of a closer, more ideal spot or spot that is closer to the users indicated ultimate destination. When the disclosed parking spot information system server becomes aware that such a spot opens up the user can receive an alert notifying the user to move his or her car to the new, closer spot. In this way for example a user can find a temporary spot that is for example only authorized for 15 minutes or temporarily for limited period of time and then request that an alert be sent to him or her when a new, longer term spot becomes available in the vicinity.

A parking user can even park in an illegal zone and indicate that an alert should be sent to him or her when a parking spot opens. In another embodiment the system can send an alert to a user 15 minutes before or ½ hour before or some selected period of time before the users present parking spot expires, such as prior to a meter expiry. In this manner the system can be used to jockey and shuffle a car around over the course of a day in a particular area to always remain in compliance with parking rules. The filters for searching can be set to for example alert a user of the availability of a parking spot along the user's present route.

This consumer system can be used by subscribing on a per month basis or a geographical basis so that an urban user can subscribe to the regions that correspond to where the user drives and parks.

In some embodiments, the disclosed parking spot information system can also be used to find and display the location of a charging station for electric or hybrid cars.

One embodiment of a method for locating information using the disclosed parking spot information system consumer product can include all or some of the following steps performed by a user in any or no order: 1. establish a disclosed parking spot information system account at an online internet website by registering, creating a profile, or confirming that user is a real person via a email; 2. request a summary statement of the parking rules that apply to location, optionally along with a cartoon illustration of each parking sign on that block; 3. get current location on a map, such as an online map and search for different types of parking using parking filters including, for example: garage parking; meter multi-space parking; meter resident parking; pay parking meter here; commercial parking; valet parking; visitor parking; 12,000 lb vehicle parking; handicap parking; no parking anytime; 15 minute loading zone; pick up/drop off zone; evacuation route; cab stand; and others; 4. use the functions of a map, such as an online map to determine how far a destination is from a parking space; 5. view desired parking location using a web-based street view, such as a street view; 6. view parking data in a list with walking distance information to destination; 7. review advance parking alerts; 8. set a parking alert event; 9. let the disclosed parking spot information system know when one is leaving a parking space; 10. Turn off the alert; 11. Get walking directions back to a car; 12. Use a compass locator, such as a digital compass, for example as provided on a mobile personal wireless communications device, to find a car in an open parking lot; 13. View available parking spaces; 14. Contact the operator of a car in leaving a parking space to validate the parking space is still available, for example by text or call or preset function key, 15. Request alerts sent to push-notification, text, voice mail, email home phone, or work phone.

The disclosed parking spot information system consumer application can provide parking information for various destinations. For example, a user can include a destination address and the system can provide real time updated status information regarding the parking situation for that destination. The system can also provide information regarding the parking situation for areas around that area to show if there is a more favorable parking arrangement in the nearby area. When a user drives to that location and parks, he or she can input the fact that he or she has parked his or her car in a particular spot. He or she can mark the spot on a map, which information can be uploaded to the disclosed parking spot information system central server. When he or she leaves, he or she can record the fact that he or she left, which can further be uploaded to update the disclosed parking spot information system parking information database.

In some embodiments, this functionality can be integrated into the onboard navigation system existing within cars. This functionality can be tied directly into the GPS functionality of cars. Therefore, when a driver is approaching a destination entered into the car's navigation GPS, the navigation can provide instructions on finding a parking spot. When a person arrives at the destination, the onboard computer can provide any relevant parking information either via displayed text or audio commands, or both, such as "2 hour parking," "parking permit with residents sticker only," "street sweeping during the present time," "commercial vehicles only," "loading area," "handicapped zone," "restricted," "buses or public transportation zone," "fire hydrant," etc. This information can be useful to drivers for reasons well known to drivers and can be integrated into existing GPS navigation functionality in order to provide a complete package.

The in dash integrated system embodiment can provide remote updates and communication to the user through the installed disclosed parking spot information system application on the user's mobile device to alert the user when the parking time limit is impending, or impending street cleaning, for example. When a user arrives at a parking spot the user can set the estimated time of departure so that the system can upload this information for planning purposes in making recommendations for other users for parking solutions by scheduling the planned departure.

Close proximity wireless data transfer protocols, such as Bluetooth technology, can also be employed, to link a user's mobile device to a car's navigation or radio functionality in order to provide parking data and to receive data from the car as described herein in order to update the central disclosed parking spot information system database via data transfer using the user's mobile device.

An integrated in car embodiment can allow drivers to offer audio voice commands for example through a user's mobile device or through integration in an automobile audio system and the user can provide voice commands via integrated microphones in an interactive manner. Further, once the user occupies a spot and parks the car the user can indicate for example by pushing a button on the mobile device that the car has been parked and this data can be used to update the database to indicate that that open vacancy has just been taken.

Another element of the disclosed parking spot information system integrated parking system is the remote server database and the associated database management system. The database constantly maintains an updated database of parking information for all areas mapped. The system can analyze historical data to plot trends for particular days of the week and times of day and holidays and weekends in order to make the best recommendations to users. The data can be analyzed to determine high volume parking congestion periods in order to make recommendations to alleviate the users' encountering such difficult periods of congestion. For example if the system indicates that parking was almost completely unavailable in a certain area on a certain date of the year for example on a holiday the disclosed parking spot information system server analytics can make recommendations for people planning trips on the next instance of the annual holiday to avoid these problems. Examples of holidays and events where parking may be limited are Red Sox game days and the Boston marathon. Weather emergencies may also limit parking availability.

In some embodiments, the user is able to self report violations citations to a chart or map of hotspots.

In some embodiments, all of the aggregated collected parking information data in terms of patterns and trends and flows can be analyzed by the disclosed parking spot information system database website analytics software on a backend server in order to provide refined suggestions in response to future queries including predicted parking situations at the time of arrival or at the estimated time of arrival. In such an embodiment the disclosed parking spot information system can use historical data to provide suggested recommended parking situations corresponding to the estimated time of arrival based on past trends.

In another embodiment of the parking information database system, relevant city parking data can be externally added into and incorporated into the database data for example to enhance and enrich the data via supplementation through other, existing data sources. For example, city web site data can be mined with a combination of scrubbing software for use on HTML city web pages and manual copy and pasting data such as from PDF into a spreadsheet and then importing into the portal the data. Such data can include garage data.

The collection system and consumer alert system, and server analytics and recommendation system can take account of special events or temporary, ephemeral or evanescent events such as parades or special events, temporary parking bans or obstructions such as dumpsters or snow conditions, snowplowing routes or snow banks or street flooding or repairs, or construction, and make suitable adjustments to recommendations and alerts in accordance therewith.

The disclosed parking spot information system can include a distributed parking data collection system. The disclosed parking spot information system data collection systems can be in the form of at least two independent image collection systems that work in concert with each other enabling existing parking signs and parking rules to be collected and uploaded to a backend network server. One of the at least two independent image collection systems can include an independent, standalone camera mounted on or in a vehicle and connected to a personal mobile wireless device such as a personal mobile communications device. This embodiment can use video or still frame capture in conjunction with object recognition processing and OCR capability to provide an automated data collection system facilitated via vehicles driving down a street. The disclosed parking spot information system can have a parking data collection camera that is an independent, separate standalone camera such as a standalone high resolution camera 1 M pixel, 16 M pixel, 20 M pixel, 100 M pixel or other resolution digital camera. The standalone camera can be connectable to a data hub via a USB Port or other data connection, to which a mobile phone or other mobile communications device can also be connected, or the camera can be directly connectable to a mobile communications device such as through a data port such as a micro SD port or another data connection port.

A second of the at least two independent image collection systems can include a handheld image data collection system for use by pedestrians collecting images of relevant parking information, for example using their personal mobile wireless communication devices having built in cameras. The collection camera can be a camera integrated into a mobile device, for example the camera that is integrated into many smartphones or integrated into a mobile personal digital assistant, or wirelessly enabled digital camera or other personal mobile communications device. This embodiment can use video or still frame capture in conjunction with object recognition processing and OCR capability to provide a parking data collection system facilitated via pedestrians walking around a street and taking pictures or video of relevant parking elements. While these first and second systems can work independently of one another, the data collected from each collectively completes the data collection process for a street. The first and second systems can also be used in conjunction with each other.

For example, the first and second systems can be used together to collect data in the following manner: If a car mounted standalone camera data collection vehicle passes by what an attached object recognition system recognizes as an obstruction blocking or partially blocking a parking sign and causing the disclosed parking spot information system collection to question whether the obstruction might have obscured the clear view of a parking sign, then the system can automatically photograph the obstruction, geocode the location at which the system suspects that the parking sign could be located, notify the backend server to create a request to send out a pedestrian data collector to the location of the obstruction to verify that there was or was not a parking sign hidden behind the obstruction.

For example, the following is a non exclusive list of some possible vehicle obstructions the object recognition or OCR system can recognize as possible obstructions of a parking sign: delivery truck; crane; dry cleaner truck; moving truck; construction vehicles; maintenance vehicles; ice cream truck; fire engine truck; service truck; ambulance; produce truck; bread tuck; freezer truck; tow tuck; 18 wheeler truck; police van; gasoline truck; propane truck; dump truck; boat being pulled behind a truck; flatbed truck with construction material loaded on it. The following is a partial non exclusive list of possible natural obstructions the object recognition system can recognize as possible obstructions: over grown bushes; too much direct light; leaves from a tree; shadows; sign bent down because of storm damage.

Embodiments of a data collection system can employ a handheld data collection system ("walker" system) including a personal mobile data device such as personal mobile data device equipped with a camera and equipped with GPS, or connected to an external GPS, for capturing parking image and location information including parking signs, rules and their locations, parking meters, rules and locations, as well as mailbox location and their pick up schedules and open parking spots. The system can utilize a high resolution camera, such as 1M pixel to 100M pixel camera, for example a 16 M pixel capable camera.

The disclosed parking spot information system can include a personal digital assistant data collection application for installation on mobile technology devices and phones ("walker" application). The walker application can utilize the camera functionality of such devices in order to capture and record the location of parking signs, parking meters, fire hydrants, bicycle lock up points, open parking spots, vacant parking spots, recently vacated parking spots, construction sites, general parking obstructions, valet only sites, etc.

The walker application can utilize online mapping data, such as an online map, and GPS location functionality of the mobile device. In some embodiments, the personal handheld data collection system can include a GPS system, for example such as provided by a GPS chip with a data connection to a handheld personal mobile communication device. The GPS functionality can provide location information for collected parking data Native GPS functionality on the user's mobile device platform or in the host vehicle can be used to record the fact that the consumer has moved; alternatively or in addition, native accelerometer functionality can be used to determine that he or she departed, any of which therefore can indicate that a new open parking spot has just become available.

The walker data collection application can use the GPS functionality of the walker's mobile device to enable the walker's mobile device to find the location of the user corresponding to where the user takes a photograph, and display a pin or marker on the walker's device display, such as an "X" over a map overlay layer which the walker can view on his handheld mobile device.

Figure 6:
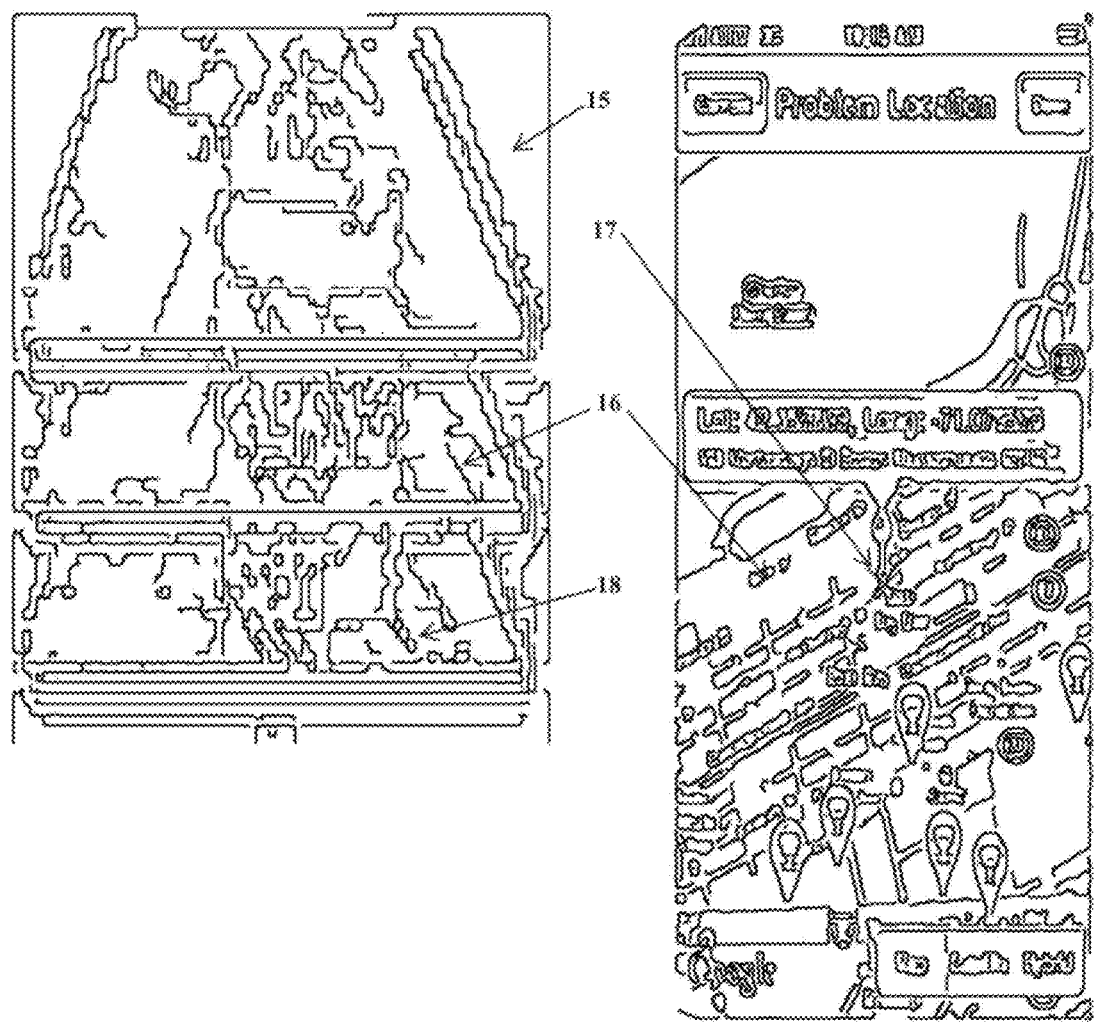
FIG. 6 illustrates an embodiment of a method for marking parking information and elements of an embodiment of a system for practicing the method.

The System can generate and use one or more "layers" of data. For example, as shown in FIG. 6, a first layer can be a map layer 15 containing an application programming interface (API). A second layer can be a location marker layer 16, on which the location marker data, such as an X marker 17, for example indicating the location of the parking element collected in the image, can be maintained. A third layer can be image data layer 18 containing data such as a digital photo frame or a video frame, or live or saved video data.

The walker can have an opportunity to make an adjustment of the location of the marker to correspond to the actual location of the element he has recorded, as needed for accuracy. The system can employ offset geocoding for this step. After processing, the disclosed parking spot information system does not need to retain the raw image data and it can be discarded, for example to conserve data space.

The walker collection application can perform OCR on the recognized signs collected and offer the walker a selection of choices of recognized text, and the walker can pick the correct text from a list offered by the application, which selection is noted and uploaded to correspond to the rules for that location.

The walker application also can utilize the accelerometer functionality of the mobile device to track the location of the user. Using this system, a user can travel around an area to be mapped either on foot or by vehicle or on bicycle. If the bicycle or car, the phone or mobile device can be connected through a mounting device to the bicycle or the vehicle to record the surrounding environment in real time.

In addition to data collected through images and location data provided via GPS, or other means such as an accelerometer, an operator (data collector) can manually input data, such as parking information or the hours of operation of a postal mailbox, for example through an interface on the personal mobile device as provided by a data collection application running on the personal mobile wireless communication device. A user can enter the existence of parking information such as parking meters, and open parking spots, while the GPS can add the location of the parking meter or spots.

The disclosed parking spot information system can upload the data to a network cloud database via the mobile device's wireless communication functionality. The data upload can occur automatically according to a schedule or as needed, periodically or continuously. In some embodiments, the disclosed parking spot information system captures an image at 16 M pixel resolution, turns the image into a cartoon including outlines, performs object character recognition on the image, and uploads the relevant parking data to the server to the data collection parking information database. After this, the raw image data can be discarded.

In the alternative, the cartoon image can be uploaded to the server at which point the optical character recognition can be performed by the server in order to recognize signage text for relevant parking information.

In some embodiments, the application uses a compression scheme. Images are compressed at the remote site of collection by the collection platform such as a mobile handheld wireless device, and the compressed images are uploaded directly to the remote server, for example by object character recognition and OCR analysis. In the alternative, images are uploaded in raw form to the server and analyzed at the server. Additionally, optical character recognition can be performed at the site of collection, for example, by the mobile device, or by the camera, and the optical character recognition data can be uploaded to the server independently from or along with the image data or apart from the image data. Compression can occur at the server, optical character recognition and or object recognition can be performed at the server or on the mobile device or at the independent camera.

In some embodiments, the walker application turns an image into a representation or cartoon in order to perform object recognition, or otherwise performs object recognition using other object recognition methods deployable on a mobile device, as are known in the art. OCR can also be performed by the walker application. A collected image can capture the relevant text appearing on the relevant signage. The walker application can further employ an Optical Character Recognition (OCR) application to recognize the text that appears on recorded signage. After any object recognition and OCR analysis is complete and relevant data confirmed and uploaded or directly uploaded, the photograph data can be discarded. Objects that can be identified include parking signs, hydrants, meters, and other street elements relevant to parking conditions. Collected and generated image and location information and other relevant data can be uploaded to the server periodically or automatically.

The disclosed parking spot information system data collection system or walker application can be deployed across a cadre of subscribed affiliated users who download the walker application for free from a web site. All recorded information can be periodically and automatically synchronized to a central network cloud database server, for example via a wireless or wifi data connection.

When deployed on foot, a user can sign up with a central collection activity management website, which can be integrated with a parking data database, to sign up to collect data for a specified area using the walker application downloaded and installed to the walker's own device. The user can navigate to the web site and sign up to be a collector, or "walker." In some embodiments, the walker data collector can be become compensated for mapping a certain area. The walker can walk around in a neighborhood and take pictures of signs for parking spots. All or only some parking signage can be collected.

The disclosed parking spot information system can include a website portal for the disclosed parking spot information system. The disclosed parking spot information system website portal can be automated and can automatically provide compensation to walkers for mapping an area. The compensation level can be adjusted up or down depending on the necessity of fresh information corresponding to a particular area. For example, an algorithm can automatically increase the compensation offer for mapping services as mapping information becomes more stale for a particular area.

In some embodiments, the database of information can be populated, at least in part, by walkers deployed to collect information and refresh the database. They can be recruited through classified ads or web sites such as Craigslist. Potential markets of walkers can include children during the summer, after school, people walking their dogs, retired people and people who enjoy "collection" activities or being a part of a mapping effort. They can download the collection application ("walker application") for free at the disclosed parking spot information system website.

The walker system is designed to be employed in a data collection capacity by individuals who already own mobile phones equipped with high resolution cameras such as 8 M pixel resolution or greater. In this embodiment, a data collector who desires to participate can navigate on the Internet to the disclosed parking spot information system website where he or she can enter his or her location or the desired location of data collection. The user can create a profile ending an account for a profile for continued collection activities. The user can then reveal a map of all of the neighborhoods where collection of data is required. The user can sign up to collect data for certain neighborhood. At that point the user can download application to his or her phone. This application is a collection application.

A user can then embark on a collection effort by walking around his or her neighborhood or the neighborhood of collection that he or she has signed up for on the web site and take pictures of open parking spots as well as take pictures of other salient, conspicuous or relevant parking elements, such as restricted parking areas such as curbs painted red or yellow, handicap zones, open parking spots, or fire hydrants. In order to collect the user can take a picture for example of a parking sign with parking rules on it. The application will then place the marker over the user's location by using the GPS functionality of the user's mobile device on an online map.

Manual collection mode can be performed wherein the walker can refine the actual location of the elements on a map, confirm the contents of the image and confirm the results of the optical character recognition, in this manual collection embodiment, the walker collection application can upload the image data to the server which conducts optical character recognition, or the optical character recognition is performed directly on the mobile device, and the results of the optical character recognition are presented to the user for confirmation and/or correction. The user can make any corrections as necessary to correct the contents, for example the text of a collected parking sign image. The user can also have an opportunity to move a location marker on a map of the walker's location to refine the position to ensure that the marker is accurately placed to be associated with the parking element that the user desires to capture.

In some embodiments, the user can be presented with a drop down menu with different parking elements listed thereon including all the relevant parking elements to be collected such as fire hydrants, parking signs, dumpsters, open spots, restricted routes, detours, handicapped zones, etc. The user can select the associated correct option that most accurately describes the element captured by the camera. If the user has selected some sort of parking sign that bears text, the disclosed parking spot information system can either conduct optical character recognition on the image directly on the walker's mobile device via the collection application in order to determine the context of the text, or upload the image directly to the disclosed parking spot information system database server for optical character recognition to be performed at the server.

The image and cartoon form can efficiently reflect the relevant information about the existence of parking elements within the field. This information can be uploaded to the server directly along with or apart from, with or without the raw image data. Based on the contents of the image as analyzed in the results of the object recognition, the server can present the user with a drop down menu of associated choices corresponding to the determined contents of the image. The user can confirm by selection the appropriate contents of the image.

In another embodiment, walker data collection can proceed automatically. In this embodiment, a user can set the collection mode to automatic data collection on the application and simply proceed to snap photos or record video. As the photos are collected the application automatically analyzes the contents to determine what the image contains and uploads the data automatically to the server including marking the location of the parking element.

In some embodiments, data collection using the walker system can be performed by someone riding a bicycle who can stop periodically along the route of his bicycle ride to collect data. Additionally the walker system can be employed by someone riding in a car, such as a passenger. The walker system automatically can upload relevant data transparently to the server.

In some embodiments, in signing up for a job as a data collector for a walker system, a potential user can login and create a profile at the walker website. The walker website can be a completely independently functional autonomous website for data management and collection. Prospective walker collectors can visit the website and create a profile about where they live in the neighborhoods where they would like to be able to participate in napping. They then can determine instantly the availability and necessity for mapping services at a neighborhood around where they live or anywhere in the world.

High volume, high quality walker collectors can create profiles and gain recognition for their efforts by the community of walker collectors as hosted by the disclosed parking spot information system website.

The website backend server database management system can calculate compensation for the users performing collection activity based on the image that is uploaded, and the uploaded data. The system can pay the users per upload. Payment can be provided to a user's account periodically via check or electronic means such as an online money transfer service.

Users can be compensated for collection activity through, for example an online money transfer account. In another embodiment users can be compensated through cash or check or credit card or money order or barter or by earning points or chits or badges or smiles or goodwill or credits of any kind exchangeable for goods or services.

The disclosed parking spot information system database web site can automatically calculate a real time compensation scheme based on the necessity of fresh data for a certain area For example higher compensation can be offered for mapping services where the data is becoming stale. An algorithm used by the website can automatically adjust the compensation scheme in real time to account for differences over time of the age of the data.

Another payment system is served directly by the user's mobile phone carrier. For example a mobile service provider can contract directly with a provider of the disclosed parking spot information system to directly provide the disclosed parking spot information system functionality on the consumer side to the users of its phone service. This functionality can be charged as a part of the mobile phone user's service plan and collection activities can be credited against the user's bill so that a user can enroll as a collector directly with his mobile service provider to use his mobile phone with the walker data collection application and gain credits for pictures uploaded, which the mobile service provider can credit against the user's bill. The system can further be used to earn minutes of voice or data time, or bits of data bandwidth for example a mobile service provider can exchange one or five or 10 minutes of airtime or a measure of data transfer in exchange for one or two or three or some number of verified uploaded walker images or data.

The disclosed parking spot information system can incorporate a data quality control system. The quality of the data can be verified by backend managers or backend processing algorithms for example to ensure uniqueness and robustness, and to screen out spurious or specious attempts to collect compensation. The quality control system can be used to prevent collectors from "gaming" the system. It can be self enforcing through providing the consumer users the opportunity to flag incorrect data, which can be correlated to the provider of the data, and for example when a walker collector has a certain number of flags the provider can be booted from the system. Data can be assigned a quality score, for example when two or three users agree independently on the accuracy of the data, the originating collector's score can go up. Data can receive positive quality points when consumer users receive the data in a response to request without any negative flags over a period of time or number of users. The originating collector's quality rating can be enhanced through a history of generating such quality data, and diminished for generating poor quality data.

Further, data entered can be weighted for quality based on how many collectors have provided corroborating information. Users can also therefore earn quality scores based on the historical accuracy of the data that they have provided while logged in wider their user profile as walker data collectors. Users may not be paid for duplicate entries or may be paid less. Data quality can receive a poor or spurious rating for example if the GPS point of entry is too close together for several entries by the same user or repeated attempts at the same entry.

In another embodiment of a collection system, an independent camera is mounted on a vehicle, such as a car or truck, a passenger vehicle or commercial vehicle, a livery vehicle or taxicab, or limousine or on a postal truck or a delivery truck. The camera can be mounted externally on the vehicle or inside the vehicle on the dashboard. The camera can have a high resolution, for example between one and 500,000 mega pixels, more particularly between four and 800 M pixels such as for example 20M pixels. The camera can be connected to a personal digital assistant device. The connection can be by means of a USB cable and a hub or directly from the camera to the phone or by wireless connectivity such as by Bluetooth or other wireless connectivity solution as is known in the art. The mobile device can be connected to the hub via a docking station mounted within the vehicle, which docking station is connected directly to the camera or via a hub to the camera. The connection can be HDMI.

The standalone camera can be a machine vision camera which can be controlled by a camera management system incorporated into the bile wireless device, such as installed as a part of the disclosed parking spot information system application that can be downloaded. The camera management system can use offset geocoding and the GPS functionality of the platform device to determine the latitude and longitude of the camera and the contents of the image.

In this embodiment, the collection activity proceeds in a fashion similar to the automatic mode embodiment of the walker embodiment, except the camera is standalone and mounted on the vehicle for autonomous use. The local, mobile analytics are still provided by a downloadable collection application to the mobile device. In another embodiment, the camera is equipped with the analytics directly, and can use the communication functionality of the wireless mobile device. In another embodiment, the camera incorporates the communication functionality to the server directly. A user employing the remote camera collection system embodiment can install the collection system application onto his or her mobile device. The user can download the mobile collection application directly from the disclosed parking spot information system web site for free or for charge. In this embodiment, data collection is performed automatically as the vehicle is driven. The system can use the GPS functionality of the user's mobile device to determine the location of the vehicle at any given moment. The camera can be continuously recording potentially significant parking elements that exist as the driver drives the vehicle.

In some embodiments, an independent, standalone camera is located in a car and records parking signs automatically as the driver drives around. The camera has a field of view broad enough to record parking signs in a city driving environment, for example as the driver navigates through downtown traffic. In some embodiments, the collection application resides on a wireless phone or other personal mobile device and is connected to a standalone camera, such as a digital camera, such as a 1-100 M pixel camera, for example a 16 M pixel camera through a data connection, such as a USB port or wireless protocol. This can be particularly useful during heavy traffic when a driver is crawling around town in urban traffic and the camera has plenty of opportunity to observe and record signage. In some embodiments, the disclosed parking spot information system can employ hundreds and thousands of cameras throughout a coverage area which can be simultaneously deployed around the city or any urban area at any given time recording both signage and open parking spots.

Embodiments of the disclosed parking spot information system that make use of a standalone camera embodiment can include several elements such as a GPS system as incorporated in a vehicle, and/or as provided in a user's handheld personal mobile communication device; a computer controlled camera management system for controlling pan, tilt, automatic zoom (collectively "PTZ"), or automatic focus such as provided by software running on a processor either built into the camera or via an application installed on a user's handheld personal mobile communication device; one or more vehicle mounted cameras working either independently or in concert with each other and managed by the camera management; and data connections or hubs as necessary for data connectivity between all operating elements.

The camera management system can control the camera, for example, including by facilitating a rangefinder and operating the camera PTZ movements, controlling or directing: scanning, picture taking, video collection, reading or recognizing text on parking signs, recognizing parking signs, recognizing open parking spots, categorizing parking signs so that the parking signs can be stored in a vehicle on board computer database, converting the parking sign raw picture images to a file format such as SVG file format, and uploading of collected data to a The disclosed parking spot information system server network cloud database.

Object recognition and OCR of identified signs can continuously be performed on the image frames that are collected. The frames can be collected according to a frame rate which as examples can be between one frame and 20,000 frames per hour, or 40 frames per second. More particularly between one frame and 200 frames per minute. The frame rate can automatically be adjusted depending on an algorithm.

The algorithm can adjust the frame rate depending on the speed of the vehicle as measured by the GPS System. The frame rate can be adjusted depending on how urban the environment is as indicated by the GPS System and mapping system to which the application has access. Therefore the frame rate can be automatically adjusted continuously adjusted as the driver drives.

The frames can be collected and object recognition and OCR can be performed on the frame either at the site of collection either by the camera directly or by the mobile device. In the alternative the image can be uploaded in raw form to the server. In another embodiment, the image can be compressed and uploaded to a server for object recognition and OCR. In some embodiments object recognition is performed at the site of collection either by software integrated into the camera or by a software application run by the processor of the user's mobile device.

Object recognition can include converting the image into outlines and cartoons and performing object recognition or pattern matching on the outlines of the images in the elements that are contained within the image. Images that are identified as signs can be subjected to optical character recognition to extract the contents of the text appearing thereon. This data can all be uploaded to the server. The data upload can be performed periodically and automatically. In the standalone camera embodiment the driver of the car does not have to perform image, content, or location verification.

The standalone camera collection system can continuously operate and record frames, and after processing, the raw image data does not need to be stored—it can be dispensed with. The standalone camera collection system can continuously collect image data and associate "X" marks over the collected parking elements. This data can be uploaded to the data server or can be generated from the image data at the server level.

A standalone camera can be mounted on the right side of a vehicle to collect data on the right side, or can be mounted in the center of a vehicle to collect data from both sides of the street, for example for one way streets with parking on both sides. The standalone camera can also use a camera mounted on the left and right sides where only the left side camera collects data about the left side of the street and the right side camera can collect data from the right side of the street. Several cameras can be used, such as between one and 100, more particularly between one and 5, such as one or two.

One embodiment of a standalone camera parking data system and an embodiment of a method of using the same includes some or all of the following, in any or no order: A user downloads a collection application to his mobile device and installs it; the collection application uses a digital compass and accelerometer, such as provided in the user's handheld mobile personal communications device or as provided in the camera, to track a vehicle heading; the collection application aligns an online map to track car direction and video; the collection application moves a marker on the "X" data layer on the online map by the object recognition system; the collection application: continuously records the latitude and longitude of the vehicle; directs a standalone vehicle mounted camera to take video of the surroundings; employs object recognition and an artificial intelligence algorithm to recognize a parking sign or open parking spot; assigns a latitude and longitude to mark the location of the sign; saves that location information as metadata attached to the image of the parking sign or spot; converts the image to a cartoon illustration of the image; resizes the image for efficient transmission over the internet such as over wireless data connections; synchronizes the information to the network cloud disclosed parking spot information system parking information database; categorizes data and saves it in the database; OCRs any sign text and recognizes key words it; object recognizes any symbols; assigns names (labels) the parking sign; categorizes the parking sign correctly; assigns attributes, for example, any recognized directional arrows for opening and closing a zone; deletes any unneeded data such as raw image data. For data collected in video format, the following can optionally be added: converts the video to a picture (jpg), deletes the processed raw video or image once the video is read and the object recognition has created a .jpg image of the parking sign from the video captured.

An example of one embodiment of a method of using an embodiment of the standalone system is presented below. It will be appreciated that this is merely one embodiment of many dozen that can be employed to implement this embodiment:

A PTZ network camera is mounted by a suction mount to the top of a data collection car which is designed to capture live video footage of parking signs on each side of the street while the car travels down the street at 30 mph (keeping up with traffic) and saves it to a computer in the same car. Another embodiment employs a fixed 16-megapixel Avigilon camera body with 114° Canon fixed lens. It will be immediately appreciated that other cameras can be used. For example, the camera included in a mobile device can be substituted to perform the same camera functions directly, such as the camera in a smartphone or other personal mobile wireless device.

Figure 7:
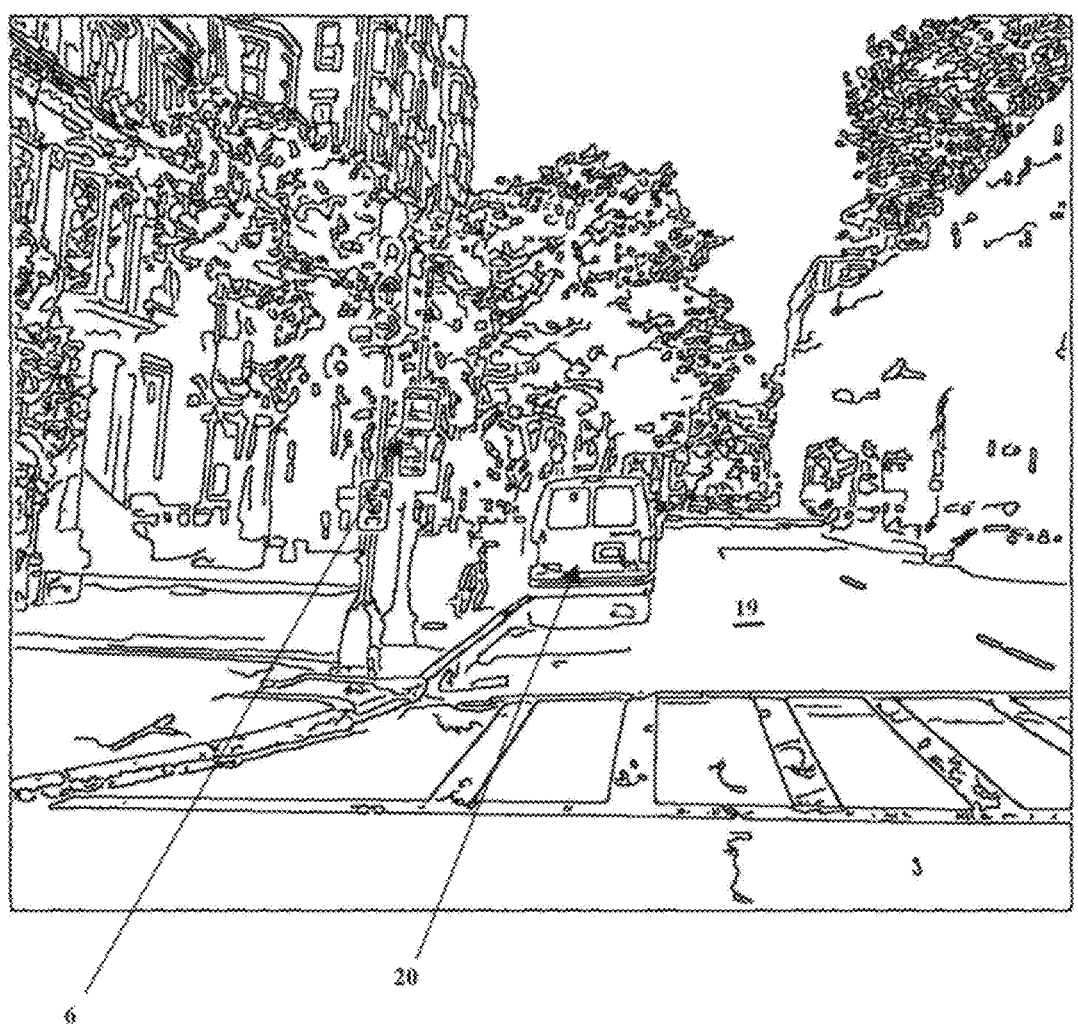
FIG. 7 illustrates a parking situation.
Figure 8:
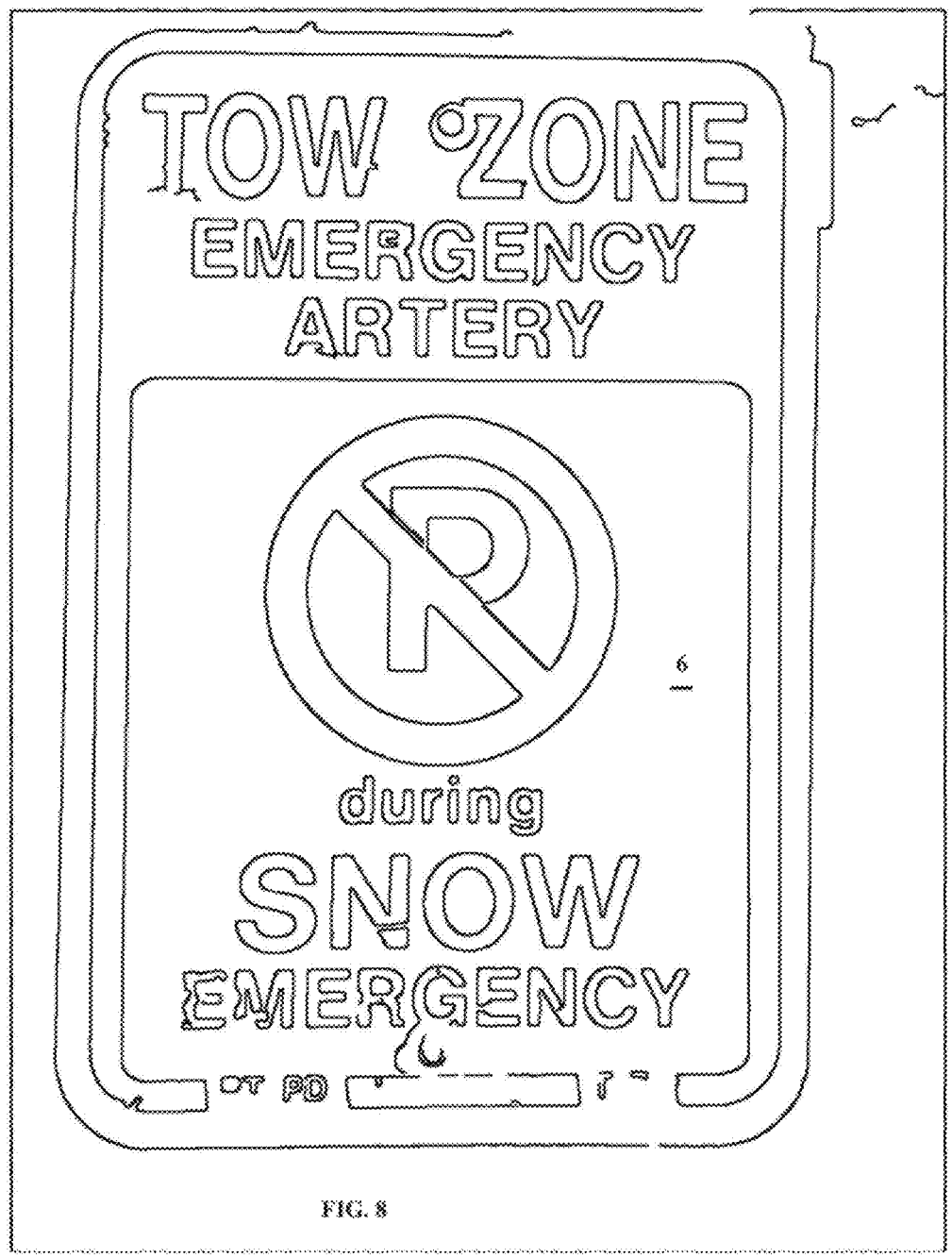
FIG. 8 illustrates a parking sign.

As illustrated in FIG. 7, in operation, the camera sees the first parking sign, such as parking sign 6, located on the side of street 19 near van 20. FIG. 8 illustrates a close up view of parking sign 6. Optionally, by combining a rangefinder, digital compass, accelerometer and GPS with the camera, the parking data collection application can calculate the angle and distance to the parking sign thus being able to determine the offset location. That information can be added to the GPS location to geocode the location of the parking sign, which information can be uploaded and saved to a parking information database.

Figure 9:
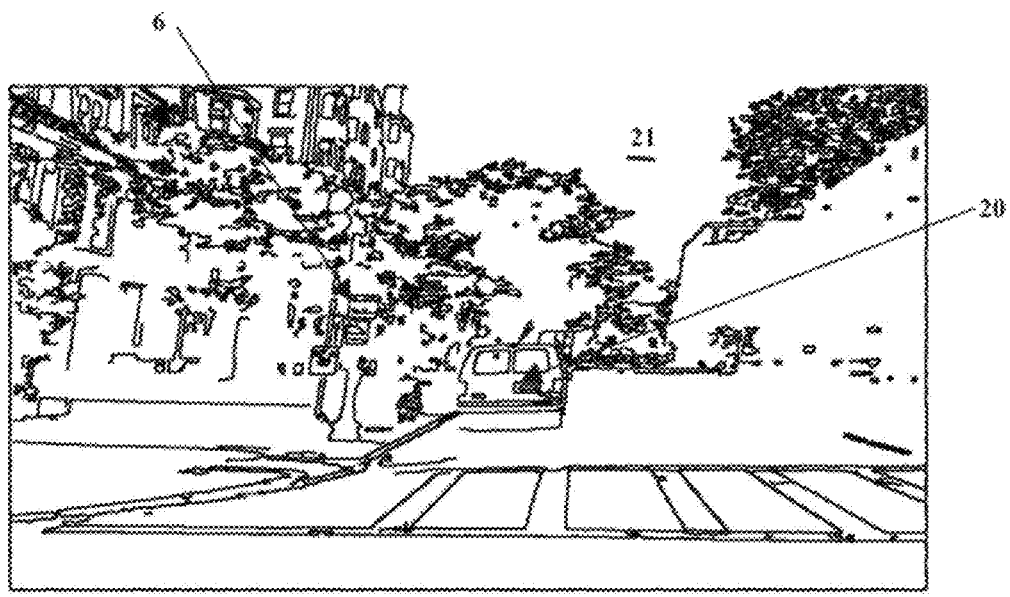
FIG. 9 illustrates a parking situation.
Figure 10:
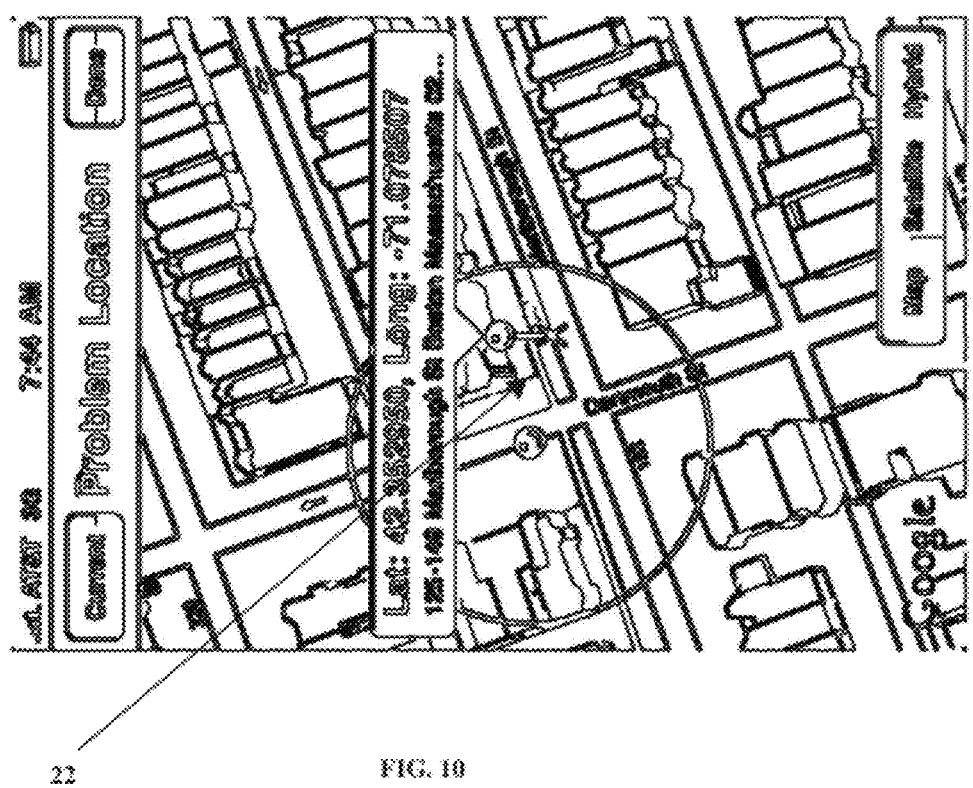
FIG. 10 illustrates an embodiment of an element of a system for creating parking information.
Figure 11:
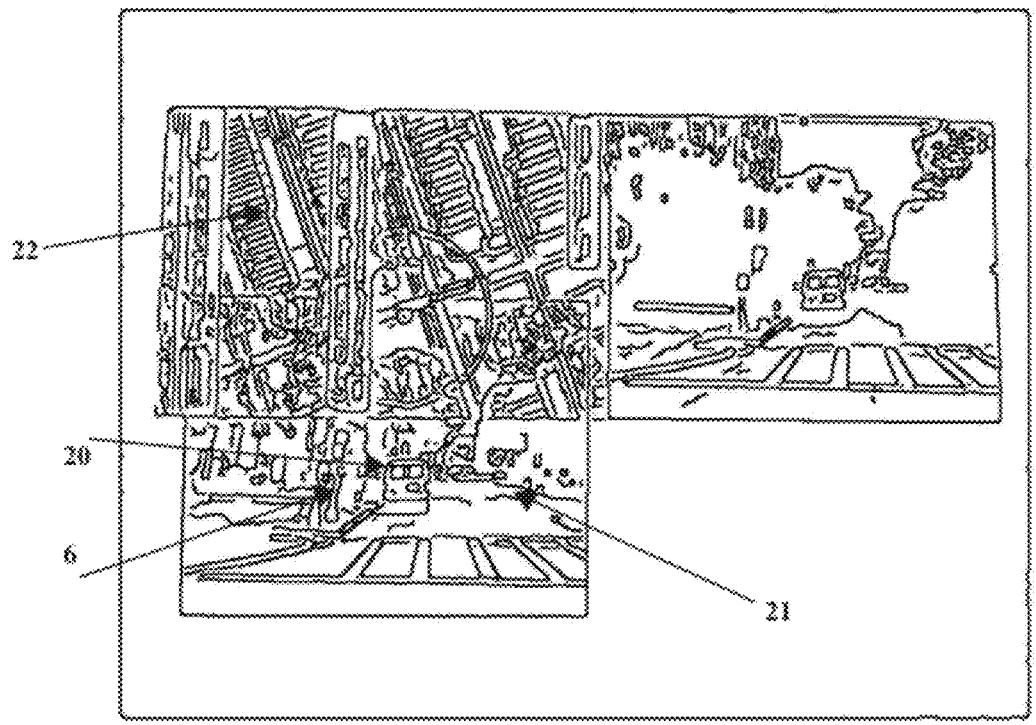
FIG. 11 illustrates an embodiment of a method for marking parking information and elements of an embodiment of a system for practicing the method.
Figure 12:
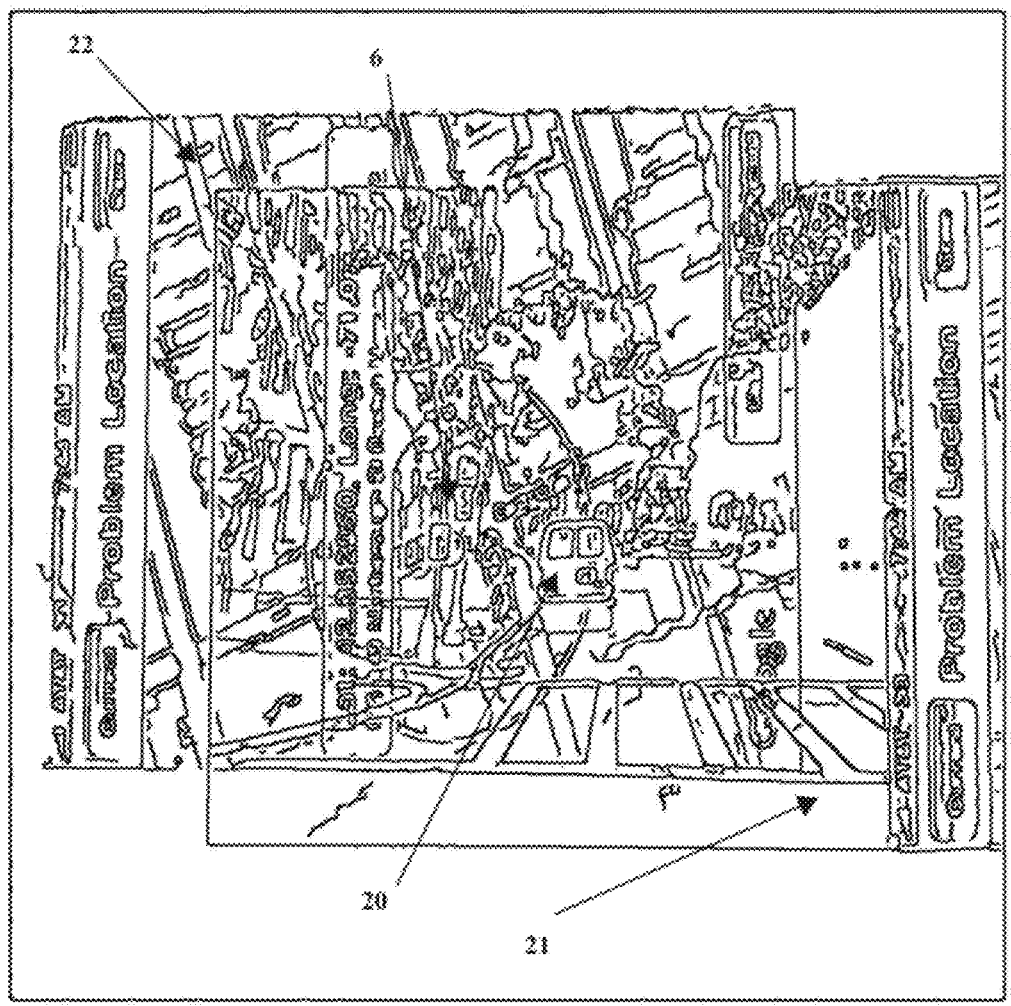
FIG. 12 illustrates an embodiment of a method for marking parking information and elements of an embodiment of a system for practicing the method.
Figure 13:
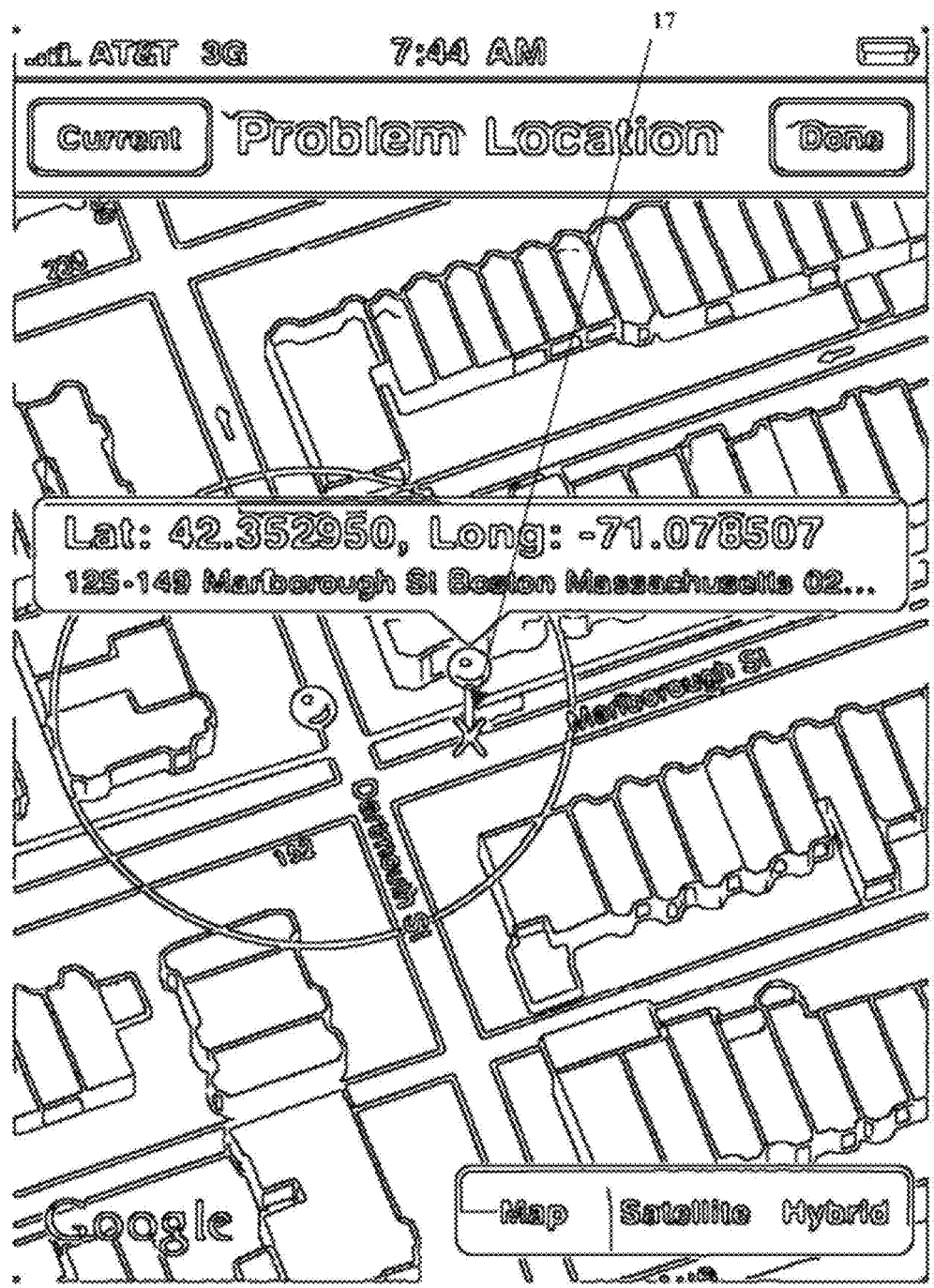
FIG. 13 illustrates an embodiment of a method for marking parking information and elements of an embodiment of a system for practicing the method.

In many embodiments, the geocoding will be performed automatically via the walker or standalone application. In an embodiment, a method for manually geocoding using the standalone system can be performed including an optional step for employment of a rangefinder: Attach to the top of the camera a rangefinder; align camera and rangefinder on a parking sign at a known range; simultaneously align both camera and rangefinder on a parking sign by looking through the camera to make sure the camera is viewing the same parking sign; perform same alignment with rangefinder to make sure the camera and the rangefinder are aligned with each other always seeing the same point they look at together; place on top of the rangefinder a digital compass/accelerometer; align the front of the compass to face the direction the camera views; float the antenna (to a GPS) with a bracket so that it does not obstruct the camera movements or field of view above the digital compass/accelerometer; synchronize to an online map: As illustrated in FIG. 9 and FIG. 10, the digital image 21 collected by the camera is related to the online map 22, and by studying the visual relationships of the digital image 21 and the online map 22, the position of the scene in the digital image 21 on the online map 22 can be determined. The parking sign 6 and van 20 are visible in FIG. 9. A digital compass and accelerometer can maintain a proper heading on a corresponding, running online map. As illustrated by FIG. 11 and FIG. 12, the System can superimpose the online map 22 on top of the digital image 21. The parking sign 6 and van 20 are visible in FIG. 11 and FIG. 12. As illustrated in FIG. 13, once the digital image, for example extracted from video, and the online map are synchronized and aligned, an "X," such as X marker 17, placed as an overlay on the hybrid online map can identify the location to be geocoded. Referring to FIG. 13, X marker 17 is located over the location where the parking sign 6 was identified. The System can be programmed to automatically move X marker 17 on top of the parking sign. The System can be programmed so that wherever X marker 17 is placed the System will retrieve the corresponding latitude and longitude for that location.

In automatically geocoding embodiments, such as those using the walker or standalone application, a video or image object recognition system can be employed to identify parking elements from the image, for example as extracted from video recorded of the side of the road as the platform vehicle drives around. The object recognition system can be implemented by software or hardware, and can be programmed to flag particular items or circumstances that are deemed noteworthy to the System. The object recognition system can recognize a parking data point, such as a parking sign, in the video and can move the X marker 17 automatically on the map to where the parking sign is located. In this way, wherever the "X" is, the latitude and longitude values can be known. An API for providing maps can be used to display a map to the user, for example to a handheld mobile communications device, under the "X".

In embodiments of the System using the standalone application, a vehicle's heading and location can be maintained by the combination of an accelerometer and digital compass communicating with a GPS located in or on top of the vehicle. The online map can constantly update as the vehicle moves, given the information regarding the location of the car via to the GPS and digital compass. By knowing a current location on a digital map aligned with live video footage, the location of parking signs can be captured by placing the "X" on the map to mark the corresponding location of the parking sign. The video of the parking sign can then be reduced to an image (such as a JPG) which can then be processed, for example by an OCR system. The text from the parking sign along with the geocode information can then be identified and the sign assigned a unique name and stored, for example in a parking information database, for example a network database, or locally on a user's device, or in the vehicle computer. The image of the parking sign can then be converted to an illustration of the parking sign and saved as another file, such as a "png". The image of the photograph of the parking sign can also be resized to a much smaller file size.

A smaller image, such as an image of a parking sign, and the corresponding illustration, along with the geocode and any other metadata can be saved to a location, such as an external hard drive. The original video data can be purged from the System and deleted. This description represents one complete cycle which gets repeated for every parking sign or other parking element of interest, periodically, up to several times per minute or several times per second, or as slowly as several times per hour, such as once every four minutes depending on the speed of the platform vehicle and the level of activity and parking information around the vehicle. In this way, hundreds of parking signs and open parking spots can be captured over the course of a mile, such as approximately 250 parking signs over the course of a mile, for example in one or a few minutes, such as approximately 4 minutes.

The standalone camera system can be adapted to be employed by taxicabs. Taxicab drivers can apply to become members of the disclosed parking spot information system and network and they can receive compensation for their work. For example, in some embodiments, they can leave the system running all the time as they drive. The standalone camera system can be programmed to recognize open parking spots. In this embodiment, taxi companies can be commissioned to implement the cameras in their cars to record parking situations all over town. In this way the parking situation all over town is constantly updated in refreshed. In some embodiments, the taxis can have permanently or removably installed high resolution cameras pointed at the right side of the street and connected to a GPS to indicate their present location. The high resolution cameras are connected to a mobile smartphone, mobile PDA, or other personal handheld mobile wireless device, or another mobile device equipped with GPS and the downloaded free collection application. In some embodiments, the cameras are connected to the mobile device through a USB hub. In another embodiment, data connections are wireless. When the taxi is driving around, the information can be uploaded periodically to the server through either ambient unsecured wifi networks or through cellular networks such as 3g or 4g cellular networks.

The rate of collection can be up to about 250 parking signs per mile or higher which can be collected at any speed and within a period of as few as 2 minutes or 1 second. In the city environment data collection can the performed during the night and during the day.

Another embodiment for data collection includes an in-dash integration for direct integration of the disclosed parking spot information system into the navigation and GPS System and onboard computer of OEM cars, as well as a part of aftermarket car kits. In such embodiments the park me analytics can be integrated directly into an automobile, including in some embodiments a standalone camera system. Another embodiment of the integrated system makes use of the integrated parking cameras offered on some cars to collect data and frames for analysis as disclosed herein.

Another embodiment of the integrated in car system uses parking proximity sensors in the bumpers of cars that are so equipped to determine the existence of new parking spots as they open up in front of or behind a car, the location of which is indicated by the car's onboard GPS System, which data reflecting the existence of a newly vacated parking spot is automatically and continuously monitored and uploaded to the disclosed parking spot information system data server to update the disclosed parking spot information system database. In this manner all of the parked cars on a city block for example running the disclosed parking spot information system integrated parking system can be constantly monitoring the existence of available parking spots.

All embodiments can communicate relevant information to the user via voice commands, either directly through the user's mobile device, or through a hands free set, or through a Bluetooth unit.

When the system is integrated or operating in integrated in car embodiment with the automobile it can automatically sense when the car is parked for example by how long the car has remained stationary, when the car is been placed into park, when the parking brake is set and when the ignition is turn off obviating the need for the user to manually enter the parked status information. Similarly when the system is integrated into the car GPS system the disclosed parking spot information system can automatically update the parking database when the user departs again. The system can know when the user departs by when the car is moving again via information provided by the car's GPS. In addition the system can know when the car is moving or stationary via wheel speed indicators.

A commercial application is another embodiment the disclosed parking spot information system. The commercial application is designed to be employed on commercial fleet vehicles such as delivery trucks, such as parcel delivery trucks and postal vehicles and flower delivery trucks and fleet vehicles and taxicabs. The disclosed parking spot information system can include a commercial customer embodiment, which embodiment can provide parking data to mapping companies, business listings, GPS companies, in-dash navigation companies and the GPS fleet management industry and products. The technologies deployed in the commercial embodiment can include GPS and mesh-networks aggregating data collected by the disclosed parking spot information system which can be retrieved from a network cloud database to a consumer device, such as a mobile phone.

One particular commercial embodiment is adapted to be integrated into fleets of rental cars, so that travelers and tourists and business people can rapidly and efficiently find parking in unfamiliar environments in which they may not be aware of the local parking rules and customs.

Another commercial embodiment is programmed for taxis to locate open cab stands around a city, for example in front of hotels and transportation hubs such as airports and train stations and bus stops and metro and subway stops, so that the cabbie can locate the spot where few taxis presently are, to reduce redundancy of taxi services and excess concentration of cabs at certain spots, and alleviate dearths of cabs at other spots. The filters for this embodiment automatically take into account the user's profile data of being a livery vehicle and the special parking spots available for such users.

The commercial data for delivery applications can take into account data provided by the user and uploaded to the back-end database that is entered at the beginning of the route or beginning of a shift to continuously recommend parking solutions for the user's group over the course of a delivery day. In other words the user enters all of the routes delivery stops that he or she must make over the course of a shift and the system calculates continuously based on ever changing up to the minute in real time to offer a dynamic parking solution for the appropriate parking or stopping spots for each particular stop. The filters for this embodiment take into account the profile of the delivery driver and the special parking opportunities available for deliveries only and commercial vehicles only, and short term opportunities such as fifteen minutes, or limited time spots. In this way the delivery company can save money and parking tickets each year.

Another collection input that can be utilized in some embodiments is the collection of information regarding actual parking tickets received and other actual enforcement activities. Users can enter into the mobile application information about parking tickets that they've actually received and this data can be uploaded to the server so the server can therefore calculate particular "hot spots" where enforcement is more vigorous than others. In this way the server analytics can make recommendations to account for particular patterns of enforcement activity based on historical information. Further, this enforcement record information can be provided to subscribers and users based on inquiry.

Some embodiments of the disclosed parking spot information system include an application programming interface API for delivering the collected parking data to partners, enabling the packaging and licensing of parking data to Mapping companies, GPS companies, In-dash Navigation systems, Business Listing and GPS Fleet Tracking management systems.

Some embodiments of the disclosed parking spot information system include a mobile advertising server. Such a server can enable the provision of advertisements embedded into the disclosed parking spot information system mobile applications, and/or applications of complimentary partners, including location based advertising and pattern based advertising, such as high-end advertisements for consumers who routinely spend time parking along high-end shopping districts, or food advertisements for consumers who routinely spend time parking at or near restaurants.

The disclosed parking spot information system data can be sold to towns and municipalities to determine drivers who are in violation of parking regulations and to determine where the greatest concentration of violators are located so that parking enforcement efforts can be concentrated on high yield areas. The information can also be sold to companies that maintain maps and directions or any other company that offers directions for driving. The data can also be provided to and integrated by GPS companies.

The disclosed parking spot information system can also provide an integrated Car Locator for example for a want ad subscriber who is either selling or searching for a car. This Car Locator can assist consumers to locate where the car is and view details about the car. The car sale functionality can be integrated with a "pimp my car" functionality that can form a part of the disclosed parking spot information system parking data system, which can allow a user to create a viewable profile including photos and information about the user's car, which can be viewed by other registered users in the system.

Another embodiment of the disclosed invention involves a map overlay deployed in order to traverse a street from one POI to another in either direction.

Figure 14:
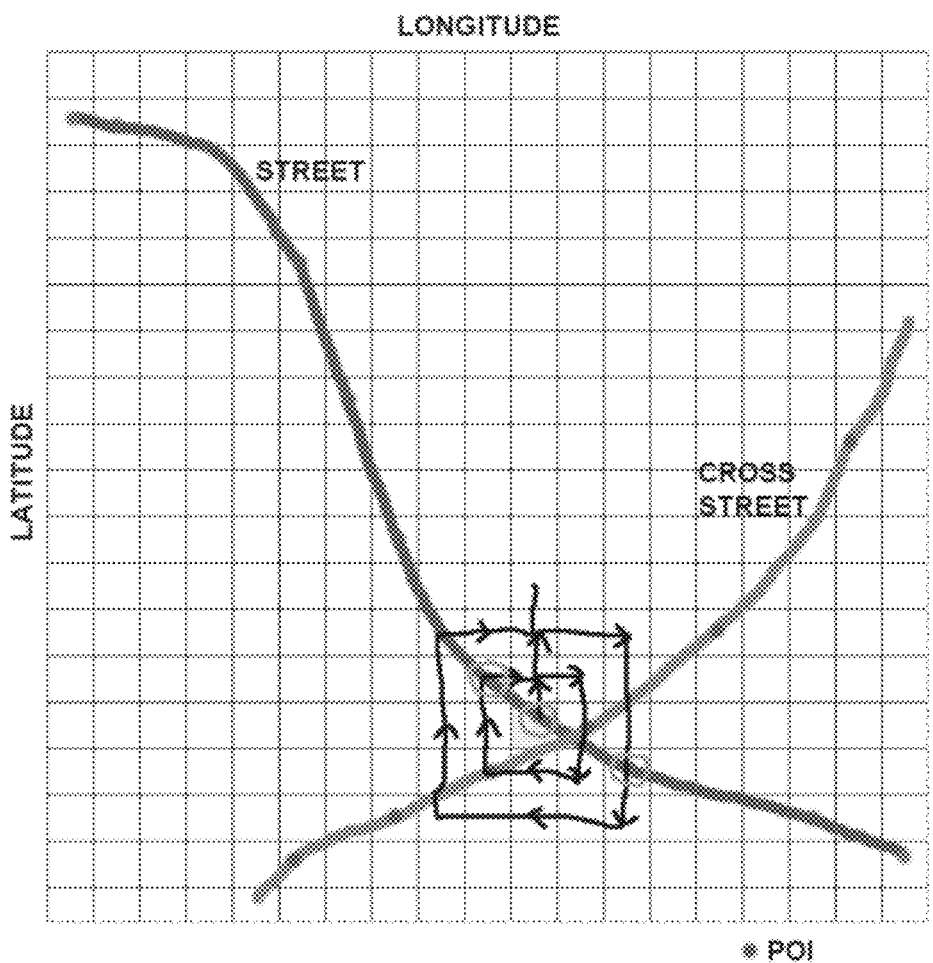
FIG. 14 illustrates an embodiment of a method for traversing a street from one point-of-interest to another in either direction.

To obtain accurate parking rules for any given location, it will be necessary to overlay a map over the POI data in order to be able to traverse a street from one POI to another in either direction. The scheme in FIG. 14 uses a grid layout to represent the spatial locations of POIs, based on their known latitude and longitude coordinates (geocodes). The grid is aligned to standard compass directions (north-south and east-west). POIs are entered in a table (2D array), indexed by their latitude and longitude so that they reflect their real-world spatial locations. The cell size in the grid should be smaller than the minimum spacing between POIs (so that only one POI is possible per cell), but not too small in order to keep the table size down. Assume a cell size of 1 square foot (1×1). For Boston, which is 48 square miles, we construct a map that is 7×7 miles, or 39,560×39,560 feet. Therefore, our array size is 39,560×39,560=1,366,041,600 elements.

Once the POI map is created in matrix form, a set of doubly linked lists will be generated, one for each block of each city street. Each doubly linked list will allow a block to be traversed from one POI to the next in either direction. Each node (POI) will store a vector which will give us the distance and direction to the next nearest POI on the block.

Streets may be further subdivided into blocks, so each street is represented as a singly linked list of blocks. Therefore, to access any POI, we first follow the street linked list to get to the block, and then follow the block linked list to get to the POI.

Our map data structure needs to store the following information:
 (1) POI identification number
 (2) numerical ID (e.g. POI #5,240 of 488,655 in city)
 (3) POI type
 (4) numerical ID (e.g. type #32=valet parking sign)
 (5) Geocode
 (6) latitude 42.353880°)
 (7) longitude (e.g. −71.078737°)
 (8) Street name (e.g. Beacon Street)

(9) Side of street (e.g. right)
(10) Vector to previous POI
(11) distance (e.g. 50 feet)
(12) direction (e.g. 11.35°)
(13) Vector to next POI
(14) distance
(15) direction
(16) (possibly other information)
As C data structures this might be:

```
struct geocode {
    float latitude; // 4 bytes
    float longitude; // 4 bytes
};
structvector_prev {
    unsigned int distance; // 4 bytes
    float angle; // 4 bytes
};
structvector_next {
    unsigned int distance; // 4 bytes
    float angle; // 4 bytes
};
struct map {
    unsigned intpoi_id; // 4 bytes
    unsigned short poi_type; // 2 bytes
    struct geocode; // 8 bytes
    char street_name[15]; // 15 bytes
    boolstreet_side; // 1 byte
    structvector_prev; // 8 bytes
    structvector_next; // 8 bytes
};
```

With a map data structure size of 46 bytes, our array size becomes 1,366,041,600×46=62,837,913,600 bytes=5852 gigabytes. If this amount of storage is problematic, then the array cell size should be increased accordingly to decrease the table size. However, the cell size must always be smaller than the minimum spacing between POIs.

The linked lists would look like:
Street block 1→block 2→block 3 . . . .
Block 1↔ POI 1↔ POI 2↔ POI 3 . . . .

To generate the doubly linked list of POIs for each block (FIG. 14), we start at the beginning of the block and continually search for the next nearest POI on the same side of the block. To do this, we perform a radial (spiral) search from the current POI until a valid neighboring POI is found. The first search runs clockwise at a radius of it cell, and if no POI is found, then the search continues at a radius of 2 cells, and so on, until the nearest POI is found or the end of the block is reached. If a POI is found that does not belong on the same street, it is discarded and the search continues. When the neighboring POI is found, a new spiral search begins at that location to find the next neighboring POI. This process continues until the end of the block is reached.

The process of generating the linked lists should occur after data collection for a street is completed. Once all the street and block linked lists are created, the map array can be safely deleted. A copy should be maintained in persistent storage so that updates can be made when new POIs are collected and uploaded to the system.

Another embodiment of the disclosed invention is a method for creating walker jobs. The goal is to create uniform length gigs for walker data collectors.

The problem can be stated as follows:
Create a set of gigs of approximately one mile walking length that will completely cover a city's roadways, so that a minimum number of gigs is needed. At each location where a route within one gig touches a route within an adjacent gig, a small amount of overlap is needed to ensure complete coverage. It is also necessary to track how much of a gig a data collector has completed, so if a gig is abandoned and only partially complete, the remainder of the gig can be re-assigned to another data collector.

Figure 15:
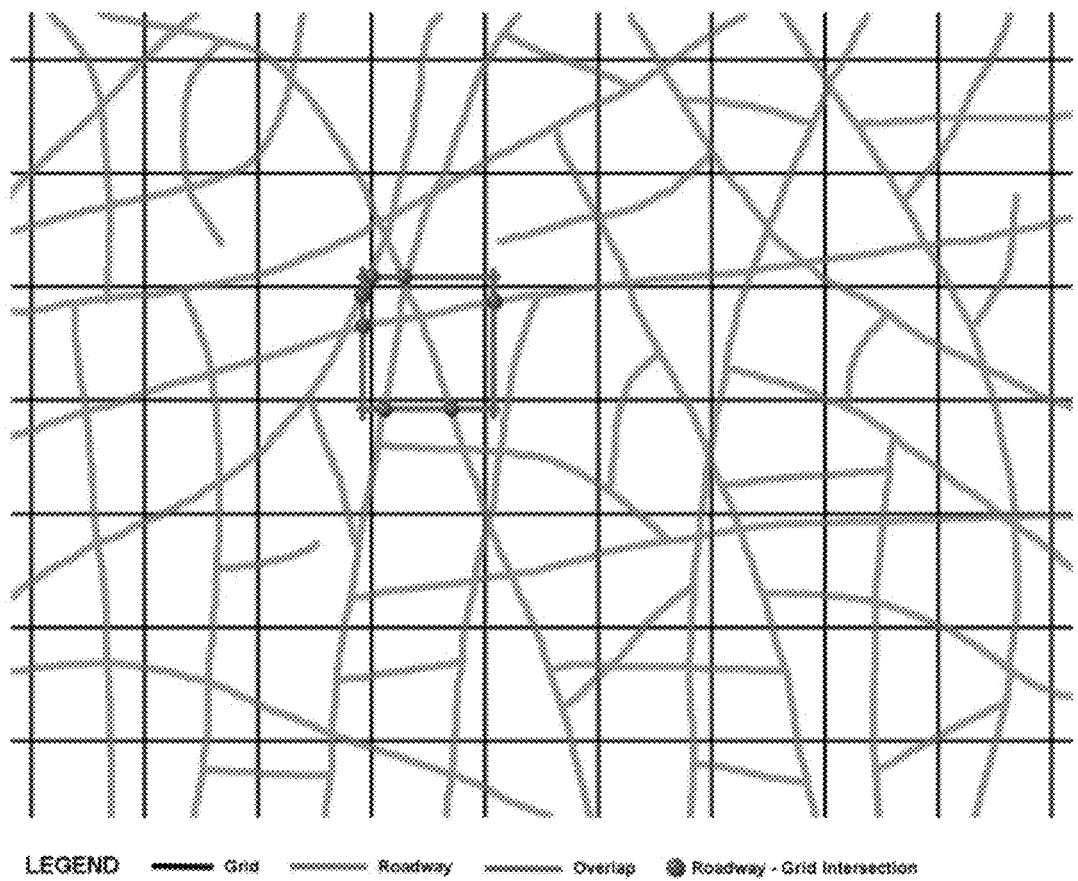
FIG. 15 illustrates an embodiment of a method for provisioning uniform length gigs for data collectors.

The mapping API will provide the lengths of the route segments within each tile, the sum of which is approximately one mile, as shown in FIG. 15. The tiles displayed in FIG. 15 are square for illustration, but the actual partitioning need not be into rectangular regions.

This problem has been well studied and there exist some fast algorithms for the partitioning of equal routes. One such method is to partition a city map into a collection of disjoint convex sub-regions, with each sub-region containing one depot, and with all sub-regions having the same total lengths of roads. Each vehicle then finds its route by solving a Chinese Postman Problem, for which fast algorithms are already known. Another such method is described in a publication entitled "Map segmentation algorithms for geographic resource allocation" authored by John Gunnar Carlsson (University of Minnesota, Twin Cities) and Yinyu Ye (Stanford University), the entirety of which is hereby incorporated by reference. Another such method is described in a publication entitled "An algorithm for the design of mailbox collection routes in urban areas" authored by Laporte, Chapleau, Landry, and Mercure, found in the Elsevier journal Transportation Research Part B: Methodological, the entirety of which is hereby incorporated by reference.

Figure 16:
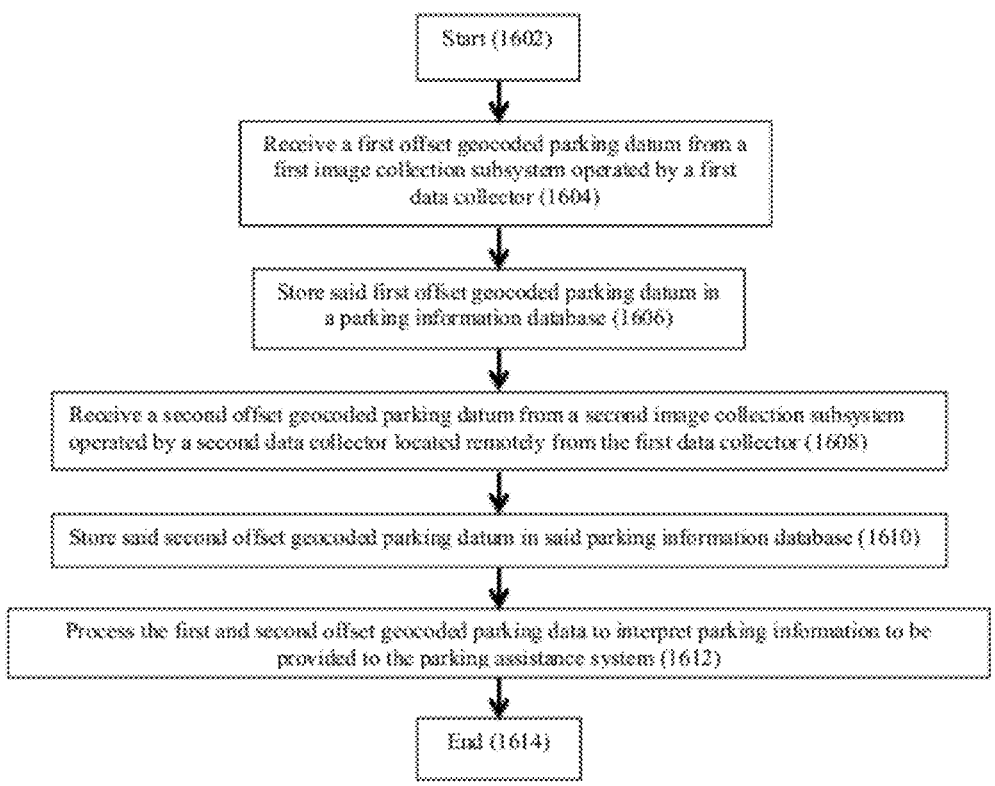
FIG. 16 illustrates a flowchart of a process of one embodiment of the present invention.

FIG. 16 illustrates a flowchart 1600 of a process of one embodiment of the present invention. The process starts at step 1602, which then proceeds to step 1604: receiving a first offset geocoded parking datum from a first image collection subsystem operated by a first data collector. The process then proceeds to step 1606: storing said first offset geocoded parking datum in a parking information database. The process then proceeds to step 1608: receiving a second offset geocoded parking datum from a second image collection subsystem operated by a second data collector located remotely from the first data collector. The process then proceeds to step 1610: storing said second offset geocoded parking datum in said parking information database. The process then proceeds to step 1612: processing the first and second offset geocoded parking data to interpret parking information to be provided to the parking assistance system. The end of the process is achieved at step 1614.

Figure 17:
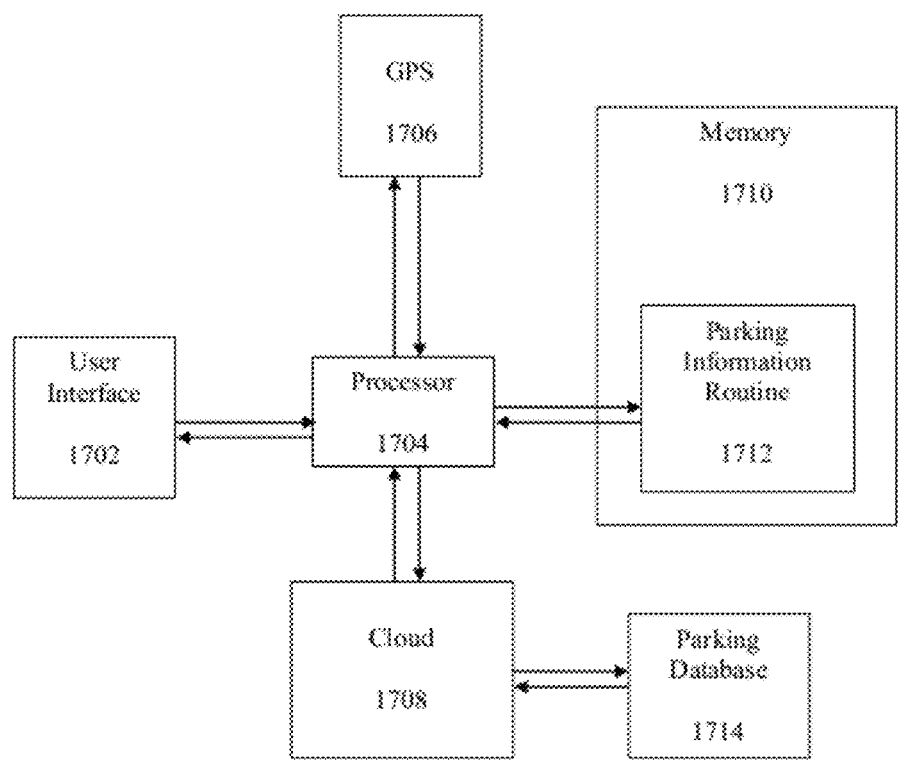
FIG. 17 illustrates a system according to one embodiment in which the present invention may be produced.

FIG. 17 illustrates a system 1700 according to one embodiment in which the present invention may be produced. The system includes a user interface 1702, which may be displayed to a user of the system through an image collection subsystem. The system also includes a processor 1704, operatively connected to memory unit 1710. The memory unit 1710 has loaded parking information routine 1712, which when executed causes the system to perform a process comprising the steps of receiving a first offset geocoded parking datum from a first image collection subsystem operated by a first data collector, storing said first offset geocoded parking datum in a parking information database, receiving a second offset geocoded parking datum from a second image collection subsystem operated by a second data collector located remotely from the first data collector, storing said second offset geocoded parking datum in said parking information database, and processing the first and second offset geocoded parking data to interpret parking information to be provided to the parking assistance system. The system 1700 also includes a GPS unit 1706, which is used to provide a geocode such as a latitude and longitude pair. A user of the system 1700 may, via user interface 1702, offset the geocode provided by GPS unit 1706. Finally, system 1700 includes a connection between processor 1704 and a cloud 1708. This cloud may for example be a network connection to the Internet, connecting the processor 1704 to a remote parking database 1714 where parking data is stored and referenced.

Accordingly, while the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

Finally, while the invention has been particularly shown and described with reference to particular embodiments thereof, it will be understood by those skilled in the art that various other changes in the form and details may be made without departing from the spirit and scope of the invention, as defined in the appended claims.

What is claimed is:

1. A method for provisioning parking information to a user, the method comprising:
   receiving a geocoded location;
   receiving data from a database;
   receiving a list of preferences;
   filtering the data with reference to distance from the location and the preferences to produce a list of candidates; and
   presenting the data or the candidates to the user.

2. The method of claim 1, further comprising the step of: displaying the data or the candidates on a map.

3. The method of claim 1, further comprising the step of: requiring the user to provide a credential.

4. The method of claim 1, wherein at least one of the preferences is selected by the user.

5. The method of claim 1, wherein the data or the candidates include at least one of the following:
   a special purpose for the data or candidates;
   a size of vehicle for the data or candidates;
   a type of vehicle intended for the data or candidates;
   a vehicle currently occupying the data or candidates;
   a circumstance affecting availability of the data or candidates;
   a source for the data or the candidates;
   a reliability rating for the source;
   a time of last verification for the data or the candidates;
   a parking rule for the data or the candidates;
   a fine for violating the rule;
   a summary of violations of the rule; and
   a usage profile of the data or the candidates.

6. The method of claim 1, further comprising the steps of:
   performing an analysis of the data or the candidates; and
   presenting the results of the analysis to the user.

7. The method of claim 1, further comprising the steps of:
   performing an analysis of the data or the candidates; and
   presenting the results of the analysis to the user;
   and in which the analysis is one of the following:
   a time-of-arrival calculation from the location to the data or the candidates;
   a distance calculation from the location to the data or the candidates;
   an optimal routing between the location and the data or the candidates;
   a predicted availability of the data or the candidates; and
   a predicted fee for using the data or the candidates.

8. The method of claim 1, further comprising the steps of:
   performing an analysis of the data or the candidates; and
   filtering the data or the candidates with respect to the results of the analysis.

9. The method of claim 1, further comprising the steps of:
   performing an analysis of the data or the candidates; and
   filtering the data or the candidates with respect to the results of the analysis;
   and in which the analysis is one of the following:
   a time-of-arrival calculation from the location to the data or the candidates;
   a distance calculation from the location to the data or the candidates;
   an optimal routing between the location and the data or the candidates;
   a predicted availability of the data or the candidates; and
   a predicted fee for using the data or the candidates.

10. A parking information provisioning system, comprising:
   a parking information database configured to store the data;
   a processor connected to the database and configured to execute program code; and
   a memory connected to the processor and configured to store program code, which program code, when executed by the processor:
   receives a geocoded location;
   receives data from the database;
   receives a list of preferences;
   filters the data with reference to distance from the location and the preferences to produce a list of candidates; and
   presents the data or the candidates to the user.

11. The system of claim 10, further comprising a means of displaying the data or the candidates on a map.

12. The system of claim 10, further comprising a means of authenticating the user.

13. The system of claim 10, further comprising a means of obtaining at least one of the preferences from the user.

14. The system of claim 10, wherein the data or the candidates include at least one of the following:
   a special purpose for the data or candidates;
   a size of vehicle for the data or candidates;
   a type of vehicle intended for the data or candidates;
   a vehicle currently occupying the data or candidates;
   a circumstance affecting availability of the data or candidates;
   a source for the data or the candidates;
   a reliability rating for the source;
   a time of last verification for the data or the candidates;
   a parking rule for the data or the candidates;
   a fine for violating the rule;
   a summary of violations of the rule; and
   a usage profile of the data or the candidates.

15. The system of claim 10, further comprising a means of:
   performing an analysis of the data or the candidates; and
   presenting the results of the analysis to the user.

16. The system of claim 10, further comprising a means of:
   performing an analysis of the data or the candidates; and
   presenting the results of the analysis to the user;
   and in which the analysis is one of the following:
   a time-of-arrival calculation from the location to the data or the candidates;
   a distance calculation from the location to the data or the candidates;
   an optimal routing between the location and the data or the candidates;
   a predicted availability of the data or the candidates; and
   a predicted fee for using the data or the candidates.

17. The system of claim 10, further comprising a means of:
performing an analysis of the data or the candidates; and
filtering the data or the candidates based on the results of the analysis.

18. The system of claim 10, further comprising a means of:
performing an analysis of the data or the candidates; and
filtering the data or the candidates with respect to the results of the analysis;
and in which the analysis is one of the following:
a time-of-arrival calculation from the location to the data or the candidates;
a distance calculation from the location to the data or the candidates;
an optimal routing between the location and the data or the candidates;
a predicted availability of the data or the candidates; and
a predicted fee for using the data or the candidates.

19. A computer program product consisting of a computer readable storage medium storing computer executable instructions that, when executed, implement a method for provisioning parking information, said method comprising:
receiving a geocoded location;
receiving data from a database;
receiving a list of preferences;
filtering the data with reference to distance from the location and the preferences to produce a list of candidates; and
presenting the data or the candidates to the user.

20. The product of claim 19, wherein the instructions further provide a means for presenting the data or the candidates to the user on a map.

21. The product of claim 19, wherein the method further comprises the step of requiring the user to provide a credential.

22. The product of claim 19, wherein the method further provides a means for the user to select at least one of the preferences.

23. The product of claim 19, wherein the data or the candidates include at least one of the following:
a special purpose for the data or candidates;
a size of vehicle for the data or candidates;
a type of vehicle intended for the data or candidates;
a vehicle currently occupying the data or candidates;
a circumstance affecting availability of the data or candidates;
a source for the data or the candidates;
a reliability rating for the source;
a time of last verification for the data or the candidates;
a parking rule for the data or the candidates;
a fine for violating the rule;
a summary of violations of the rule; and
a usage profile of the data or the candidates.

24. The product of claim 19, wherein the method further comprises the steps of:
performing an analysis of the data or the candidates; and
presenting the results of the analysis to the user.

25. The product of claim 19, wherein the method further comprises the steps of:
performing an analysis of the data or the candidates; and
presenting the results of the analysis to the user;
and in which the analysis is one of the following:
a time-of-arrival calculation from the location to the data or the candidates;
a distance calculation from the location to the data or the candidates;
an optimal routing between the location and the data or the candidates;
a predicted availability of the data or the candidates; and
a predicted fee for using the data or the candidates.

26. The product of claim 19, wherein the method further comprises the steps of:
performing an analysis of the data or the candidates; and
filtering the data or the candidates with respect to the results of the analysis.

27. The product of claim 19, wherein the method further comprises the steps of:
performing an analysis of the data or the candidates; and
filtering the data or the candidates with respect to the results of the analysis;
and in which one the analysis is one of the following:
a time-of-arrival calculation from the location to the data or the candidates;
a distance calculation from the location to the data or the candidates;
an optimal routing between the location and the data or the candidates;
a predicted availability of the data or the candidates; and
a predicted fee for using the data or the candidates.

* * * * *